United States Patent
Kuhel et al.

(10) Patent No.: US 8,569,205 B2
(45) Date of Patent: Oct. 29, 2013

(54) MEDIA FOR REMOVAL OF CONTAMINANTS FROM FLUID STREAMS AND METHOD OF MAKING SAME

(75) Inventors: Anthony E. Kuhel, Solon, OH (US); Harry A. Adams, Bedford Heights, OH (US); Gina Sacco, Warren, OH (US)

(73) Assignee: Mar Systems, Inc., Solon, OH (US)

( * ) Notice: Subject to any disclaimer, the term of this patent is extended or adjusted under 35 U.S.C. 154(b) by 395 days.

(21) Appl. No.: 12/830,684

(22) Filed: Jul. 6, 2010

(65) Prior Publication Data

US 2011/0000855 A1 Jan. 6, 2011

Related U.S. Application Data

(60) Provisional application No. 61/223,149, filed on Jul. 6, 2009, provisional application No. 61/310,773, filed on Mar. 5, 2010.

(51) Int. Cl.
*B01J 20/00* (2006.01)

(52) U.S. Cl.
USPC .......................................... 502/414; 502/415

(58) Field of Classification Search
USPC ................................................. 502/414–415
See application file for complete search history.

(56) References Cited

U.S. PATENT DOCUMENTS

| | | | |
|---|---|---|---|
| 3,194,629 A | | 7/1965 | Dreibelbis et al. |
| 4,009,009 A | * | 2/1977 | Massoth et al. ............ 95/135 |
| 4,027,001 A | | 5/1977 | Henderson et al. |
| 4,094,777 A | | 6/1978 | Sugier et al. |
| 4,101,631 A | | 7/1978 | Ambrosini et al. |
| 4,344,793 A | | 8/1982 | Burkett et al. |
| 4,474,896 A | | 10/1984 | Chao |
| 4,608,363 A | | 8/1986 | Goodboy |
| 4,640,751 A | | 2/1987 | Dyvik et al. |
| 4,824,576 A | | 4/1989 | Sood et al. |
| 4,874,525 A | | 10/1989 | Markovs |
| 4,902,662 A | | 2/1990 | Toulhoat et al. |

(Continued)

FOREIGN PATENT DOCUMENTS

| | | |
|---|---|---|
| EP | 107582 A1 | 5/1984 |
| SU | 1549585 A1 | 3/1990 |
| WO | WO-2006/034487 | 3/2006 |

OTHER PUBLICATIONS

Stenger, H. G., "Effects of Sulfur Poisoning of a Reduced Fused Magnetite Catalyst in the Fischer Tropsch Synthesis," Ind. Eng. Chem. Process Des. Dev., vol. 24, No. 2 (1985), pp. 415-420.*

(Continued)

*Primary Examiner* — Chester Barry
(74) *Attorney, Agent, or Firm* — Wilmer Cutler Pickering Hale and Dorr LLP

(57) ABSTRACT

Sorption media for removal of contaminants from fluid streams are provided. The sorption media comprise an active compound bound or linked to a support substrate or matrix. Support substrates can include iron- and alumina-based materials. A method for making sorption media for the removal of contaminants from fluid streams is also described. The method includes selecting a support substrate, and, optionally, providing a doping mixture comprising an active compound. The selected support substrate can be contacted with the doping mixture to form a doped mixture. The doped mixture can be reacted at a predetermined temperature and atmospheric environment for a predetermined duration to form an active media, wherein the active compound is bound or linked to the support substrate.

55 Claims, 19 Drawing Sheets

(56) References Cited

U.S. PATENT DOCUMENTS

| | | | |
|---|---|---|---|
| 4,911,825 A | 3/1990 | Roussel et al. |
| 4,988,494 A | 1/1991 | Lagas et al. |
| 5,064,626 A | 11/1991 | Johnson et al. |
| 5,071,475 A | 12/1991 | Barreau et al. |
| 5,085,844 A | 2/1992 | Nowack et al. |
| 5,107,060 A | 4/1992 | Yan |
| 5,141,724 A | 8/1992 | Audeh et al. |
| 5,223,145 A | 6/1993 | Markovs |
| 5,242,482 A | 9/1993 | Cangini et al. |
| 5,271,760 A | 12/1993 | Markovs et al. |
| 5,330,560 A | 7/1994 | Chao et al. |
| 5,354,357 A | 10/1994 | Markovs et al. |
| 5,360,632 A | 11/1994 | Johnson et al. |
| 5,360,779 A | 11/1994 | Cheung et al. |
| 5,409,522 A | 4/1995 | Durham et al. |
| 5,419,884 A | 5/1995 | Weekman et al. |
| 5,441,648 A | 8/1995 | Lidzey |
| 5,505,766 A | 4/1996 | Chang |
| 5,507,238 A | 4/1996 | Knowles |
| 5,523,067 A | 6/1996 | Markovs |
| 5,569,436 A | 10/1996 | Lerner |
| 5,597,729 A | 1/1997 | Easterly et al. |
| 5,601,701 A | 2/1997 | Cameron et al. |
| 5,601,795 A | 2/1997 | Ball et al. |
| 5,607,654 A | 3/1997 | Lerner |
| 5,649,262 A | 7/1997 | Walker et al. |
| 5,667,694 A | 9/1997 | Cody et al. |
| 5,670,122 A | 9/1997 | Zamansky et al. |
| 5,672,323 A | 9/1997 | Bhat et al. |
| 5,695,726 A | 12/1997 | Lerner |
| 5,711,929 A | 1/1998 | Chalkley et al. |
| 5,750,992 A | 5/1998 | Van Pelt et al. |
| 5,766,567 A | 6/1998 | Voirin et al. |
| 5,787,823 A | 8/1998 | Knowles |
| 5,795,159 A | 8/1998 | Ralls et al. |
| 5,803,663 A | 9/1998 | Matsuyama et al. |
| 5,827,352 A | 10/1998 | Altman et al. |
| 5,854,173 A | 12/1998 | Chang et al. |
| 5,900,042 A | 5/1999 | Mendelsohn et al. |
| 5,902,376 A | 5/1999 | Currie |
| 5,928,617 A | 7/1999 | Grande |
| 5,934,091 A | 8/1999 | Hanson et al. |
| 5,944,196 A | 8/1999 | Oram et al. |
| 5,965,095 A | 10/1999 | Owens et al. |
| 5,989,486 A | 11/1999 | Washburn et al. |
| 5,989,506 A | 11/1999 | Markovs |
| 6,024,931 A | 2/2000 | Hanulik |
| 6,103,205 A | 8/2000 | Wojtowicz et al. |
| 6,117,330 A | 9/2000 | Tarbet et al. |
| 6,117,333 A | 9/2000 | Frankiewicz et al. |
| 6,129,843 A | 10/2000 | Petty et al. |
| 6,136,281 A | 10/2000 | Meischen et al. |
| 6,136,749 A | 10/2000 | Gadkaree et al. |
| 6,139,605 A | 10/2000 | Carnell et al. |
| 6,156,214 A | 12/2000 | Bongen et al. |
| 6,156,281 A | 12/2000 | Akers et al. |
| 6,165,366 A | 12/2000 | Sarangapani |
| 6,168,768 B1 | 1/2001 | Alexion et al. |
| 6,224,740 B1 | 5/2001 | Gestermann et al. |
| 6,244,055 B1 | 6/2001 | Hanson et al. |
| 6,248,217 B1 | 6/2001 | Biswas et al. |
| 6,258,334 B1 | 7/2001 | Gadkaree et al. |
| 6,268,590 B1 | 7/2001 | Gale et al. |
| 6,284,199 B1 | 9/2001 | Downs et al. |
| 6,322,613 B1 | 11/2001 | Wojtowicz et al. |
| 6,326,326 B1 | 12/2001 | Feng et al. |
| 6,328,939 B1 | 12/2001 | Amrhein |
| 6,432,313 B2 | 8/2002 | Bruening et al. |
| 6,491,887 B1 | 12/2002 | Cheung et al. |
| 6,521,131 B1 | 2/2003 | Hamilton et al. |
| 6,528,030 B2 | 3/2003 | Madden et al. |
| 6,533,842 B1 | 3/2003 | Maes et al. |
| 6,537,443 B1 | 3/2003 | Frankiewicz et al. |
| 6,551,515 B1 | 4/2003 | Bruening et al. |
| 6,610,263 B2 | 8/2003 | Pahlman et al. |
| 7,022,161 B2 | 4/2006 | Nedez |
| 7,025,887 B1 | 4/2006 | Kirts et al. |
| 7,090,825 B2 | 8/2006 | Le Loarer et al. |
| 7,125,538 B2 | 10/2006 | Le Loarer et al. |
| 7,160,465 B2 | 1/2007 | Kirts et al. |
| 7,214,642 B2 * | 5/2007 | McDaniel et al. ............ 502/217 |
| 7,252,768 B2 | 8/2007 | Nedez |
| 7,341,667 B2 | 3/2008 | Kennard et al. |
| 7,449,118 B2 | 11/2008 | Kennard et al. |
| 7,479,230 B2 | 1/2009 | Kennard et al. |
| 2003/0103882 A1 | 6/2003 | Biermann et al. |
| 2003/0104937 A1 | 6/2003 | Sinha |
| 2004/0152851 A1 * | 8/2004 | Weng et al. .................. 526/127 |
| 2008/0135487 A1 | 6/2008 | Kennard et al. |

OTHER PUBLICATIONS

Alcoa Product Data for Selexsorb HCI, printed Jun. 29, 2003, 2 pages.
Alcoa Product Data for Selexsorb HG, printed Jun. 29, 2003, 2 pages.
Arsenic in Drinking Water, www.freedrinkingwater.com/water-contamination/arsenic-contaminants-remova-I-water.htm, dated printed Jun. 27, 2007, 7 pages.
Carey, T. et al., "Factors Affecting Mercury Control in Utility Flue Gas Using Activated Carbon" Air & Waste Manage. Assoc. 48:1166-1174, 1998.
Carey, Todd R. et al. "Assessing Sorbent Injection Mercury Control Effectiveness in Flue Gas Streams." Environmental Progress, 2000, vol. 19,No. 3, 167-174.
Cyr, Patric J. et al. "A pilot scale evaluation of removal of mercury from pharmaceutical wastewater using granular activated carbon." Water Research 36, 2002. 4725-4734.
Flora, Joseph R.V. et al. "Modeling Sorbent Injection for Mercury Control in Baghouse Filters: I-Model Development and Sensitivity Analysis." Journal of the Air & Waste Management Association, Apr. 2003. 53: 478-488.
Flora, Joseph R.V. et al. "Modeling Sorbent Injection for Mercury Control in Baghouse Filters: II-Pilot-Scale Studies and Model Evaluation." Journal of Air and Waste Management Association, 2003. 53: 489-496.
Ghorishi, S. Behrooz et al. "Development of a CI Impregnated Activated Carbon for Entrained-Flow Capture of Elemental Mercury." Environmental Science & Technology, 2002, 36:4454-4459.
Harten, Teresa et al. "Separations Research at the United States EPA—Toward Recovery of VOCs and Metals Using Membranes and Adsorption Processes." Ch. 17 of Green Engineering edited by Anastas, Paul et al., American Chemical Society pp. 225-235, 2001.
International Search Report for International Application No. PCT/US10/41039 mailed Oct. 12, 2010. 4 pages.
Lehamann, et al. "Activated Carbon Adsorbents from Waste Tires for Air Quality Control" Air and Waste 92nd Annual Meeting and Exhibition, 1999, 22 pages.
NETL: New Projects Positioning Coal-Fired Utilities to Meet Possible Mercury Control Standards with New, Lower Cost Technologies; U.S. Department of Energy/Natural Energy Technology Laboratory website@http://204.154.137.14/publications/press/2000/tl.sub.--mercurycon- trol.sub.--1.html; Issued on Aug. 14, 2000, 3 pages.
"CMG 273 Trapping Material for Mercury Removal from Gases and Liquid Hydrocarbon Streams." Axens Catalysts & Adsorbents. Feb. 2008. 2 pages.
Nucon: Nusorb™ Mersorb™ Family of Adsorbents: for Mercury Control, www.nucon-int.com/carbon/industrial/mersorb.shtml, date printed Jun. 29, 2003, 1 page.
Scala, Fabrizio. "Simulation of Mercury Capture by Activated Carbon Injection in Incinerator Flue Gas. 1 In-Duct Removal." Environmental Science & Technology 2001. 35: 4367-4372.
Scala, Fabrizio. "Simulation of Mercury Capture by Activated Carbon Injection in Incinerator Flue Gas. 2 Fabric Filter Removal." Environmental Science & Technology, 2001. 35:4373-4378.
Yardim, M.F. et al. "Removal of mercury (II) from aqueous solution by activated carbon obtained from furfural." Chemosphere 52, 2003. 835-841.

* cited by examiner

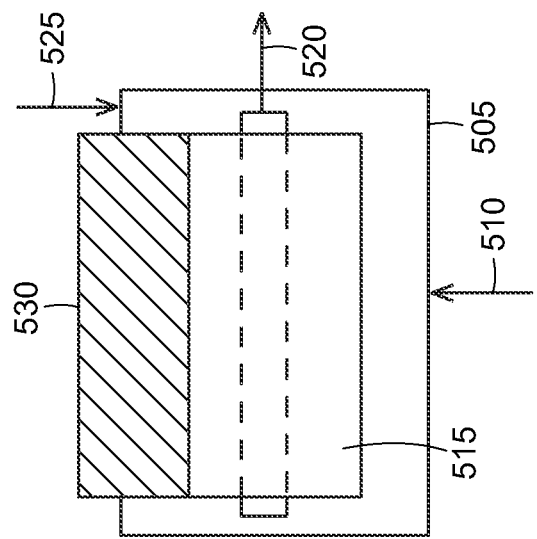
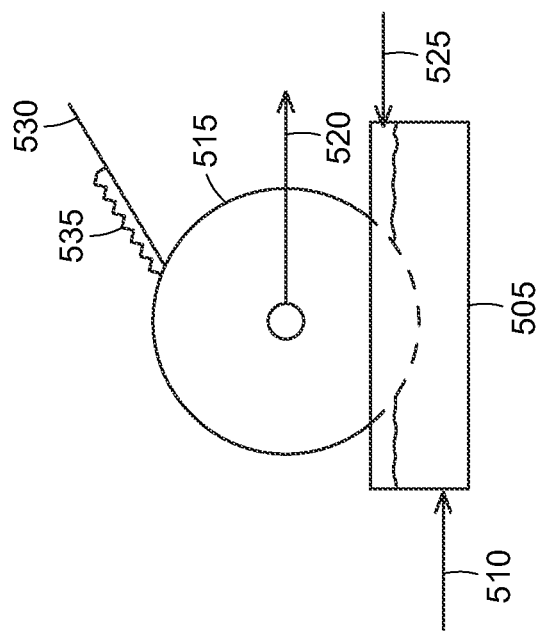
FIG. 5B
FIG. 5A

MEDIA FOR REMOVAL OF CONTAMINANTS FROM FLUID STREAMS AND METHOD OF MAKING SAME

RELATED APPLICATIONS

This application claims the benefit under 35 U.S.C. §119(e) of the following U.S. Provisional Patent Applications:

U.S. Application No. 61/223,149, entitled "Media For Removal Of Contaminants From Fluid Streams And Method Of Making And Using Same," filed Jul. 6, 2009; and U.S. Application No. 61/310,773, entitled "Media For Removal Of Contaminants From Fluid Streams And Method Of Making And Using Same," filed Mar. 5, 2010, the contents of which are incorporated by reference.

This application is related to the following U.S. Pat. Nos.:

U.S. Pat. No. 7,341,667, entitled Process For Reduction Of Inorganic Contaminants From Waste Streams, filed Oct. 29, 2004, and issued Mar. 11, 2008;

U.S. Pat. No. 7,479,230, entitled Process For Reduction Of Inorganic Contaminants From Waste Streams, filed Feb. 1, 2008, and issued Jan. 20, 2009; and U.S. Pat. No. 7,449,118, entitled Process For Reduction Of Inorganic Contaminants From Waste Streams, filed Feb. 1, 2008, and issued Nov. 11, 2008, the contents of which are incorporated by reference herein.

BACKGROUND OF THE INVENTION

1. Field of the Invention

The present invention generally relates to the use of chemical sorbents to reduce the levels of contaminants in waste streams.

2. Description of Related Art

Industrial pollutants such as heavy metals, D-block metals, mercury and arsenic pose significant health-related risks to the public. For example, several metal ions and transition metal ions have been associated with asthma symptoms such as activation of mast cells and enhanced allergen-mediated mast cell activation. Walczak-Crzewiecka, et al. "Environmentally Relevant Metal and Transition Metal Ions Enhance Fc RI-Mediated Mast Cell Activation," *Env. Health Perspectives* 111(5) (May 2003). Because these substances are generated as a by-product of industrial processes, it is important to find effective means to reduce their release into the environment.

For example, mercury emissions from coal-fired utilities, commercial boilers and solid waste incinerators represent a serious environmental problem and have been the focus of many regulatory deliberations. At present, coal-fired power plants emit the largest source of mercury emissions at 32.7%. Municipal waste incinerators and non-utility boilers each contribute approximately 18% of mercury emissions. Medical waste incinerators contribute 10% of gas phase mercury emissions. In addition to gas phase mercury contamination, mercury contaminant exists in water phase as well such as water waste discharged by petroleum refineries and steel mills. For example, water phase contaminants may include elemental, ionic, organometallic, and/or inorganic mercury species.

Mercury exposure has been associated with neurological and developmental damage in humans. Developing fetuses and young children are at particular risk of the harmful effects of mercury exposure. Mercury contamination is also a concern for populations exposed to dental practices or dental waste, clinical chemistry laboratories, pathology laboratories, research laboratories, chlor-alkali facilities, and health care waste incinerators. However, despite the desire to reduce mercury emissions, presently there are no commercially available technologies to control mercury emissions.

Similarly, exposure to arsenic poses potentially significant health risks. Arsenic is a natural element, distributed throughout the soil and in many kinds of rock. Because of its ubiquitous presence, arsenic is found in minerals and ores that contain metals used for industrial processes. When these metals are mined or heated in smelters, the arsenic is released into the environment as a fine dust. Arsenic may also enter the environment from coal-fired power plants and incinerators because coal and waste products contain some arsenic. Once arsenic enters the environment, it cannot be destroyed.

Arsenic exposure causes gastrointestinal problems, such as stomach ache, nausea, vomiting, and diarrhea. Arsenic exposure can also yield decreased production of red and white blood cells, skin changes that may result in skin cancer, and irritated lungs. Inorganic arsenic has been linked to several types of cancer and is classified as a Group A, human carcinogen. In high amounts (above about 60,000 ppb in food or water), arsenic may be fatal. Similar adverse effects have been associated with other inorganic contaminants such as cadmium, chromium, lead, and selenium.

Various carbon-based sorbents have been identified for removing mercury vapor from gas streams. T. R. Carey and C. F. Richardson, "Assessing Sorbent Injection Mercury Control Effectiveness in Flue Gas Streams," *Environmental Progress* 19(3):167-174 (Fall 2000). For example, Selexsorb® HG (Alcoa World Alumina, LLC, Pittsburgh, Pa.) and Mersorb® (Nucon International, Inc., Columbus, Ohio) are commercially available carbon-based mercury sorbents. Recycled tires have also been identified as a source of activated carbon that could be used for mercury removal. C. Lehmann et al., "Recycling Waste Tires for Air-Quality Control," January 2000. Activated carbon has many drawbacks for use in large-scale industrial processes, however. In particular, commercially available activated carbon is a relatively expensive sorbent. Although transformation of waste tires into activated carbon is an environmentally friendly means of recycling harmful waste, it is a complicated, lengthy, energy-intensive and time-consuming process. Additionally, the yield of activated carbon from waste tires is relatively low.

Currently, carbon-based sorbents can be used for removal of contaminants from water, primarily through an adsorption effect of the carbon. However, this method suffers from drawbacks such as washing off of the active materials, thus making the use of carbon-based sorbent ineffective. In addition, the used active carbon materials need to be disposed of as a hazardous material, therefore adding cost and contributing to further environmental problems.

Other currently used methods include the use of catalysts to remove mercury from hydrocarbon gases. Similarly, such methods are not effective in aqueous streams due to washing off of the active catalysts.

Thus, there is a need for new technologies to efficiently and cost-effectively reduce the level of inorganic contaminants, such as mercury and arsenic for example, in industrial emissions and specifically in aqueous streams.

BRIEF SUMMARY OF THE INVENTION

A sorption media for removal or reduction of contaminants from a fluid stream is described, comprising an active compound linked to or bound to a support substrate or matrix. A method of making a sorption media is also described.

In one aspect of the invention, a sorption media includes a support substrate and a sulfur species chemically bonded to the support substrate. The support substrate comprises a porous metallic material. The media includes at least 10 mol % aluminum species. Optionally, the sulfur species is chemically bonded to the support substrate by at least one of an ionic bond and a covalent bond.

In another aspect of the invention, the sorption media has a contaminant capacity of at least one of at least 1000 mg-mercury/kg-media, at least 2000 mg-mercury/kg-media, at least 3000 mg-mercury/kg-media, and at least 10,000 mg-mercury/kg-media.

In a further aspect of the invention, sorption media includes a support substrate and a sulfur species chemically bonded to the support substrate. The support substrate comprises a porous metallic material. The media includes at least 9 mol % iron species. Optionally, the sulfur species is chemically bonded to the support substrate by at least one of an ionic bond and a covalent bond.

In yet another aspect of the invention, the sorption media has a contaminant capacity of at least one of at least 400 mg-mercury/kg-media, at least 1000 mg-mercury/kg-media, at least 3500 mg-mercury/kg-media, and at least 12,000 mg-mercury/kg-media.

In still a further aspect of the invention, a method of manufacturing a sorption media includes selecting a support substrate comprising a porous metallic material, providing a doping mixture comprising a first sulfur species dissolved in a solvent, and contacting the selected support substrate with the doping mixture at a first temperature for a first duration to form a doped substrate. The method also includes reacting the doped substrate at a second temperature in a selected atmospheric environment for a second duration to form the sorption media. The sorption media comprises a second sulfur species chemically bonded to the support substrate. Optionally, the second sulfur species is chemically bonded to the support substrate by at least one of an ionic bond and a covalent bond.

In one aspect of the invention, a method of manufacturing a sorption media includes selecting a support substrate comprising a porous metallic material, selecting an atmospheric environment comprising at least hydrogen sulfide, and reacting the support substrate at a first temperature in the selected atmospheric environment for a first duration to form the sorption media. The selected sorption media comprises a sulfur species chemically bonded to the support substrate. Optionally, the second sulfur species is chemically bonded to the support substrate by at least one of an ionic bond and a covalent bond.

In a further aspect of the invention, the method also includes mixing elemental sulfur with the selected substrate before reacting the support substrate in the selected atmospheric environment.

In another aspect of the invention, a method of reducing a level of metallic species contamination of a fluid includes contacting the fluid including the metallic species contamination with a sorption media. The sorption media including a sulfur species chemically bonded to a support substrate. Optionally, the sulfur species is chemically bonded to the support substrate by at least one of an ionic bond and a covalent bond.

In still a further aspect of the invention, the metallic species contamination comprises at least one ionic mercury species. The method also includes selecting the sorption media for contacting the fluid from a plurality of sorption medias based on the sulfur species of the selected sorption media including a sulfide species.

In yet another aspect of the invention, the metallic species contamination comprises at least one inorganic mercury species. The method also includes selecting the sorption media for contacting the fluid from a plurality of sorption medias based on the sulfur species of the selected sorption media including a sulfate species.

In another aspect of the invention, the metallic species contamination comprises at least one inorganic mercury species and at least one ionic mercury species, the method further comprising selecting the sorption media for contacting the fluid from a plurality of sorption medias based on the sulfur species of the selected sorption media including a sulfate species and a sulfide species.

The method of claim 60, wherein the metallic species contamination comprises at least one inorganic mercury species and at least one ionic mercury species. The method also includes selecting at least a first and a second sorption media for contacting the fluid from a plurality of sorption medias based on the sulfur species of the first selected sorption media including a sulfate species and the sulfur species on the second selected media including a sulfide species.

As used herein, the terms "support substrate" and "matrix" are used interchangeably. As used herein, the terms "media", "active media", and "sorption media" are used interchangeably.

As used herein, the term "sorption" includes adsorption, chemical adsorption (i.e., chemisorption), absorption, and/or physical adsorption (i.e., physisorption).

When used in connection with a media and/or support substrate, the term "unused" refers to a material that is in its virgin or unspent form. In contrast, when used in connection with a media and/or support substrate, the term "used" or "spent" refers to a material that has been employed in one or more processes for which the material was intended. For example, a used (or spent) Claus catalyst is a catalyst that has been employed in a Claus process for recovering sulfur from hydrogen sulfide.

As used herein, the term "stream" describes a quantity of fluid having a contaminant species. A fluid stream may include a flowing fluid, but can also describe a static quantity of fluid. Thus, the sorbents described herein can be disposed in a moving quantity of fluid to effect continuous contaminant removal. Likewise, the sorbents can also be added to a fixed quantity of fluid to effect contaminant removal in a batch fashion.

BRIEF DESCRIPTION OF THE DRAWINGS

For a more complete understanding of various embodiments of the present invention, reference is now made to the following descriptions taken in connection with the accompanying drawings in which:

FIGS. 5A and 5B show another illustrative process for the use of an active media to reduce contamination levels in a fluid;

DETAILED DESCRIPTION

Figure 1:
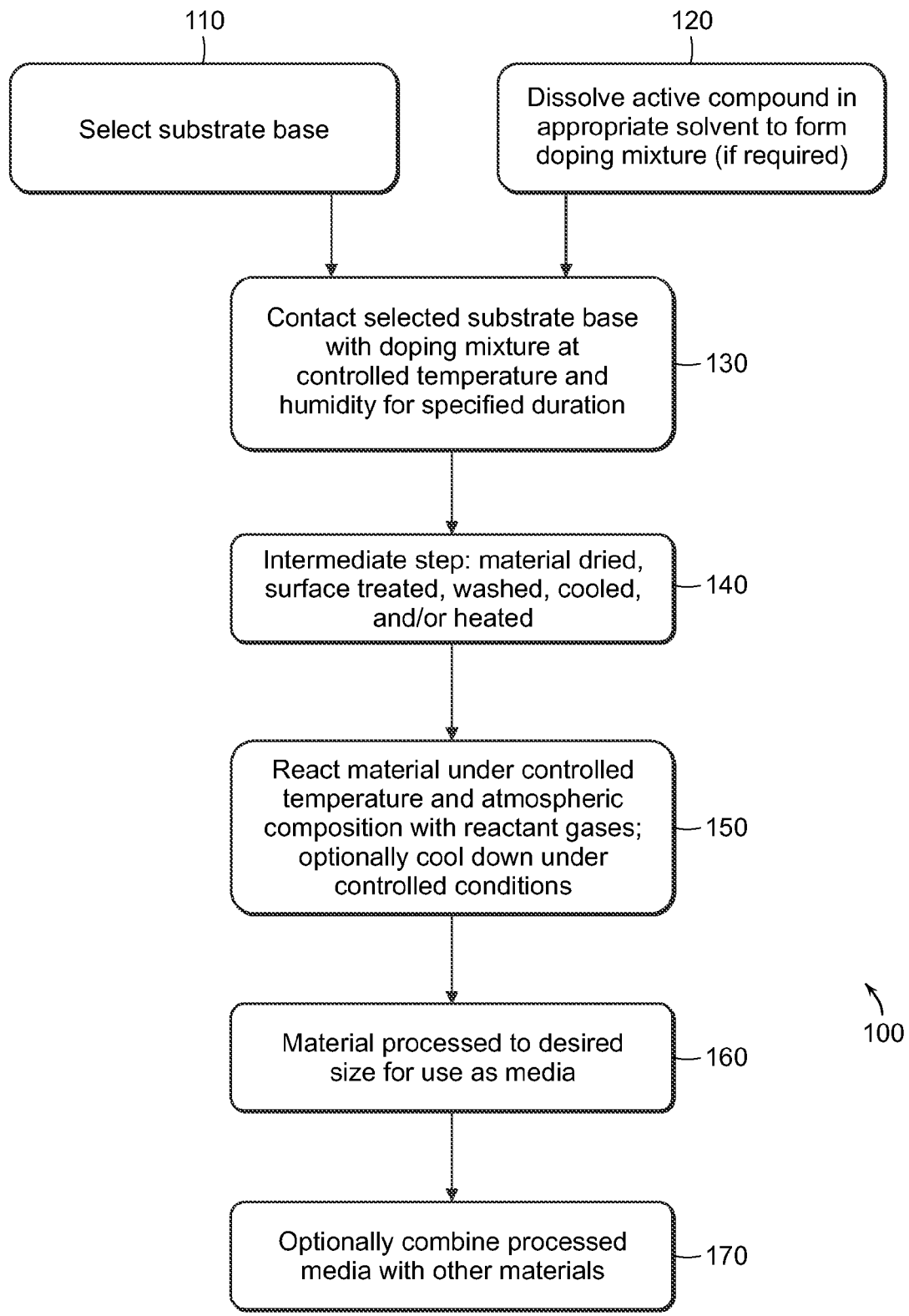
FIG. 1 shows a method of making an embodiment of a sorption media.

A sorption media for the reduction of one or more contaminants from a fluid stream is described, as well as methods of making the sorption media and using the same.

In one aspect, a sorption media for reducing contaminant levels in a fluid stream is described. The sorption media includes a support substrate or matrix bound to or linked with an active compound. Non-limiting examples of support substrates or matrixes include iron-, alumina-, silicon-, titanium-, and carbon-based substrates. In some embodiments, the alumina-based matrix includes Claus catalyst. In some specific embodiments, the Claus catalyst is virgin Claus catalyst. In other specific embodiments, the Claus catalyst is spent Claus catalyst. In other embodiments, the alumina-based matrix includes other non-Claus catalyst. In other embodiments, the media includes an iron-based matrix.

Non-limiting examples of the active compounds include sulfur, aluminum-sulfur compounds, iron-sulfur compounds, ammonium sulfate, ferric chloride, copper sulfate, copper chloride, and/or other various metal salts. Iron-sulfur compounds include, but are not limited to, ferric sulfate, ferric sulfite and ferrous sulfide. Non-limiting examples of contaminants include arsenic, mercury, and D-block metals and/or heavy metals, including, but not limited to, barium, strontium, selenium, uranium, lead, titanium, zinc and/or chromium. The reduction of other metal contamination levels is contemplated. In some embodiments, the media reduces contaminant levels from the fluid stream by one or more of adsorption, chemical adsorption (i.e., chemisorption), absorption, and/or physical adsorption.

In some embodiments, the fluid stream includes an aqueous fluid. In some specific embodiments, the aqueous fluid includes one or more of ground water, process waste water from a chemical process, and others. Other non-aqueous fluid streams are also contemplated. Likewise, the various media described herein can be used to reduce contaminated in non-liquid fluid streams.

In some embodiments, the media enable the reduction of arsenic and mercury levels in aqueous liquid streams. Other embodiments of the media enable the reduction of D-block metals and/or heavy metal levels, including, but not limited to, strontium, uranium, lead, and/or chromium.

Without being limited to any particular theory, it is believed that in the sorption media described herein, the active compound is bound or linked to the support substrate or matrix so that the loss of the active compound into the fluid stream is reduced or minimized. For example, it is thought that, in some implementations, the active compound chemically interacts with the support substrate in such a way as to become at least partially integrated with the support substrate. In other words, the support substrate and active compound form a chemical compound that holds the active compound in place. Thus, the support substrate and active compound may form a chemical bond (e.g., a covalent bond and/or an ionic bond). In other implementations, it is believed that other attraction forces reduce the mobility of the active compound. For example, the active compound and support substrate may exhibit one or more of dipole-dipole interactions, hydrogen bonding, and/or dispersion forces.

Further still, it is also believed that mechanical forces can play a role in reducing the mobility of the active compound and/or molecules and/or complexes formed by interactions between the active compound and support substrate. For example, the active compound and/or the complexes formed can be lodged into small pores in the surface of the support substrate, thereby confining the material within the pores. Similarly, the techniques described herein are believed to create active surfaces within the pore structure of the support substrate.

Due to the formation of such a bond or linkage, the active compound cannot be completely solvated by the fluid molecule and, thus, the dissolution rate of the active compound is significantly reduced. Moreover, the bond or linkage also resists physical forces of fluids in contact with the media that would otherwise wash the active compound from the surface of the media. Thus, as used herein, the dissolution rate of the active compound describes the rate of loss of the active compound from the media due to both chemical and physical phenomena. In some embodiments, the active compound for sorption of mercury is believed to be ferric sulfate, ferric sulfide, aluminum sulfate, and/or aluminum sulfide. Meanwhile, it is thought polarized iron (e.g., iron in a salt complex) is effective for sorption of arsenic. While ferric sulfate and ferric sulfide dissolve in water under standard conditions, it is believed that, by using the method described herein, ferric sulfate or ferric sulfide can be bound or linked to the support substrate or matrix comprising, e.g., alumina and/or iron. This bond allows the linked iron-sulfur and/or aluminum-sulfur compounds to be exposed to an aqueous liquid stream while dissolving into the liquid stream at a reduced rate compared with free iron-sulfur and/or aluminum-sulfur compounds in liquid not bound to any support substrate. This enables the active compound, e.g., iron-sulfur and/or aluminum-sulfur compounds, to act upon contaminants in an aqueous stream without significant loss of the sulfate and/or sulfide species into the stream itself In general, the embodiments described herein enable an otherwise soluble compound to be attached to the surface or interior of the support substrate or matrix in a way that maintains the active characteristics of the active compound while reducing the amount of the active compound washed away during use.

The scope of the invention is not limited to the use of ferric sulfate, but includes other compounds, for example, ferric chloride, ammonium sulfate, copper sulfate, copper chloride, elemental sulfur, hydrogen sulfide, and others. In some implementations, the active compound forms the bond and/or link with the support substrate and, also, provides the sorbing activity of the media. In other implementations, the active compound forms a bond and/or link with the support substrate, and an additional reaction step is performed to chemically change a portion of the active compound to provide sorbing activity (e.g., copper chloride is bonded to a support substrate and later reacted with hydrogen sulfide to form a copper-sulfur species bonded to the substrate).

In some embodiments, iron-based substrates found in used or unused commercial materials for treating natural gas to remove sulfur compounds, e.g., SULFATREAT XLP, Iron Sponge, and other similar materials, is used as the support substrate for the media as described herein. Some of these materials include iron oxides, e.g., ferric oxide and triferric oxide.

In another aspect, a method for making a sorption media for the reduction of contaminant levels from fluid streams is also described. The method includes selecting a support substrate or matrix, optionally, providing a doping mixture comprising an active compound, and, optionally, contacting the selected support substrate or matrix with the doping mixture to form a doped matrix mixture, and reacting the doped matrix mixture at a predetermined temperature and predetermined atmospheric environment for a predetermined duration to form an active media, wherein the active compound is bound or linked to the support substrate. FIG. 1 shows an overview of a method 100 of making of a sorption media in some embodiments. A support substrate, e.g., a virgin, spent, or recycled substrate, is selected as the base for the media (step 110). In some embodiments, the substrate is a used catalyst from a natural gas or other sweetening process. Examples include, but are not limited to, iron doped, virgin, or recycled Claus catalysts, as well as aerogels, titanium dioxide, iron-based natural gas treatment catalysts (e.g., SULFATREAT and others), and alumina-based catalysts. In addition, an active compound is selected and optionally dissolved in an appropriate solvent to form a doping mixture (step 120). Solvents can include aqueous solvents and/or organic solvents.

In some embodiments, the substrate may also be reduced in size prior to the drying, doping, and reacting steps using, e.g., roller, ball, or impingement mill equipment. Next, the selected substrate base and doping mixture are contacted and held in a temperature and humidity controlled environment for a selected duration to form a doped substrate (step 130). In some embodiments, the temperature is held between 30-90° C., the relative humidity varies between 0-40%, and the duration varies between 10-45 minutes. A sufficient amount of doping mixture is put in contact with the substrate base so that no compound of the doping mixture is a limiting reagent in any reaction between the doping mixture and substrate. The material (the doped substrate) is then processed by an intermediate step, during which it can be dried and/or surface treated, for example, by washing in water, acetone, or other solvent and/or further heating or cooling (step 140). For example, the doped substrate can be heated to a temperature between 100-300° C. for 1-4 hours. The material may also be cooled as part of this step 140.

In some embodiments, after drying and/or heating the substrate, a doping agent (if one is present) and the substrate are reacted under controlled temperature and atmospheric conditions, which may include various gases, as set forth below, for a selected duration to form an activated media. The specific examples set forth herein are illustrative only, as differences is doping agents, reactant gases, reaction duration, etc. will achieve different effects on the various support substrates. These effects can be controlled, by manipulating the overall process, to achieve different levels of activity of the media that are effective in sorbing particular contaminants (step 150). Non-limiting examples of doping agents include various gases and transitional metals. If the substrate has been doped, then it may require an additional drying step. In some embodiments, the media is then put in a chamber (if the chamber has not been used already for doping and conditioning of the base) and exposed to various gasses. The gases include, but are not limited to, $H_2$, Nitrogen, and $H_2S$ gases. In some embodiments, the temperature is controlled to between 100-500° C. and the atmosphere comprises any one or a mixture of hydrogen sulfide (e.g., 2-15 vol %), hydrogen (e.g., 2-15 vol %), air (e.g., 5-100 vol %), water, and/or nitrogen (e.g., 10-100 vol %). The duration varies between 1-6 hours. A sufficient amount of the gas mixture is supplied to the substrate (and doping agent, if present) during the reaction so that none of the components of the gas mixture are a limiting reagent in any reaction that takes place during the reaction step. In some embodiments, the media is further optionally doped with various transition metals such as, but not limited to zinc, strontium and copper to reduce or eliminate inorganic contaminants, including, but not limited to heavy metals such as mercury and arsenic from waste streams.

In some other embodiments, the doping agent is not added and the reaction conditions are selected to form the active ingredients on the surface of the substrate. In those embodiments, the active agent is created chemically on the surface of the substrate by, e.g., exposure to a mixture of gases in a reactive environment.

The material is then allowed to cool and is processed to achieve a desired particle size (step 160). In some embodiments, the active media can be crushed to a certain particle size using, e.g., roller, ball, or impingement mill equipment. In some embodiments, the active media is crushed or milled to a particle size in the range of 12-325 mesh. The active media may also be combined with other materials (step 170) to form a sorption media blend. Other materials suitable for blend with the active media include, but are not limited to, another active media with the same or different support substrate or active compound. In some embodiments, the active material described herein can be used as a mixture with other sorbing material such as those described in U.S. Pat. No. 7,341,667, entitled Process For Reduction Of Inorganic Contaminants From Waste Streams, filed Oct. 29, 2004, and issued Mar. 11, 2008; in U.S. Pat. No. 7,479,230, entitled Process For Reduction Of Inorganic Contaminants From Waste Streams, filed Feb. 1, 2008, and issued Jan. 20, 2009; and in U.S. Pat. No. 7,449,118, entitled Process For Reduction Of Inorganic Contaminants From Waste Streams, filed Feb. 1, 2008, and issued Nov. 11, 2008.

The steps 120-160 set forth in method 100 can be performed in a variety of sequences, and some steps may be omitted or repeated. For example, creation of a doping mixture and contacting the selected substrate with the mixture (steps 120 and 130) may be omitted. Instead, the selected substrate can be treated with reactant gases alone to form an active media (step 150). In contrast, multiple doping contact steps (using the same doping agent or a different doping agent) can be performed. The active material can also be processed to achieve a desired particle size before and/or after any doping and/or reactant steps (step 160).

Moreover, by controlling the conditions of manufacture, as disclosed herein, it is possible to adjust the rate at which the active compound is lost from the media. For example, rate of loss of ferric sulfate, in terms of iron, ranges from over 300,000 µg-Fe/L of wash water to under 200 µg-Fe/L of wash water. The retention of the active compound can also be observed by visual confirmation of color bodies and a brown/orange color, or lack thereof, in the wash water.

It is believed method 100 enables many different active compounds, including flocculating materials, to be linked to or bound with a stable support substrate or matrix to form an active media. The use of the active media manufactured using methods disclosed herein simplifies waste streams processing and enables easier management of waste products by sorbing contaminants onto the matrix. The active compounds disclosed herein can be used to manufacture the active media according to the method disclosed herein. In addition to various active compounds, different matrices or support substrates disclosed herein may be used as a base for the manufacture of the active media, using the method disclosed herein. For example, it is believed that aluminum, titanium, and/or silicone matrices can be used in place of the alumina and iron disclosed herein. The selection of active compounds, in combination with an appropriate base, enables a sorption media to be tailored to sorb a target contaminant or group of contaminants, e.g., strontium, uranium, lead, and/or hexavalent chromium.

In yet another aspect, the method of using the active media to reduce contaminant levels in fluid stream is described. The method comprises providing an active media as described herein and contacting the active media with a fluid stream containing a contaminant. The contaminant can include any one or more of the contaminants as described herein.

In some embodiments, the active media disclosed herein may be used in combination with other media to create tailored treatments for specific water problems. In some specific embodiments, an iron-based active media can be mixed with an alumina-based active media to form a mixture of active media. The mixture of active media can be used to reduce more than one type of contaminant level effectively, depending on the specificities of different active media for certain contaminants. For instance, it is surprisingly discovered that an iron-based active media mixed with an alumina-based active media can effectively reduce mercury and arsenic levels in an aqueous stream.

The media may also be used directly in fluid streams and removed by filtration. The media may also be mixed with clays to form slurry walls or liners to support remediation and to sorb trace metals that can normally leach from areas of contamination. In general, e.g., any one or more of the active medias described herein can be incorporated into products produced by AquaBlok, Ltd. of Toledo, Ohio.

For example, media #4, described below, was incorporated into an AquaBlok material at a level of 5 wt % media. A ball jar test was performed using 370 ml of 1000 ppb mercury contaminated water to which 527 g of the AquaBlok/media mixture had been added. After allowing the jar to sit for approximately 48 hours, supernatant liquid was drawn off of the top of the jar and filtered through a 1.2 µm filter and analyzed for mercury concentration. The filtered water sample contained about 22 ppb mercury. After allowing the jar to sit a total of about 120 hours, supernatant liquid was again drawn off, filtered, and analyzed. The filtered water sample contained less than 5 ppb mercury.

In some embodiments, the active media as described herein can be used to form a continuously regenerating treatment system. As described above, the incorporation of the active compound, e.g., ferric sulfate, into the media base, e.g., an alumina or iron matrix, reduces the amount of active component dissolved in use. This permits contaminants, heavy metals, color agents, and other undesirable materials in a fluid stream to accumulate on or adhere to the surface of the media and/or very small external features of the media to be removed. Thus, after use, a spent media is created that can be removed from a fluid treatment system and disposed of. For example, when the ferric sulfate/alumina media is used to treat an aqueous stream containing heavy metal contamination, the spent media is non-hazardous (per Toxicity Characteristic Leaching Procedure test). A typical concentration of heavy metal on the media is from 20 to over 10,000 mg/g-media. Metal levels reduced can include arsenic and mercury and, it is thought, a wide range of metals including lead, uranium, selenium, chromium, and other transition metals. Moreover, the use of the media is believed to be effective on a wide range of ionic and complex metal forms, including the reduction of metal levels from ground water.

In addition to treating a wide range of contaminants, the media as described herein shows an increase in the speed with which contaminants can be reduced in a fluid stream as compared to alternatives. In one illustrative embodiment, in the application of treating contaminated ground water with 3000 ppt mercury and 25 ppb arsenic, activated carbon required 90 minutes of contact time to reduce the mercury to less than 20 ppt. In comparison, a SULFATREAT XLP-based media, as described herein, needs less than 60 seconds to reduce the similar amount of the mercury contaminant. This increased speed of action over known treatment materials permits the use of the media disclosed herein in a wide range of applications not typically permitted in water service due to the amount of time needed for water to be in contact with conventional materials. Using the media, techniques, and methods disclosed herein, canisters and pre-coat filters can be used to take advantage of the media's brief effective contact time. This further enables the use of the media in continuous flow fluid bed applications and in fouling services, including, but not limited to, ground water treatment services. The ability to be used in fouling services allows for relatively high levels of contamination to be treated directly, without the need to dilute the contaminated stream prior to contamination reduction. Furthermore, the speed and high capacity allow the iron-matrix media to be used to prevent migration of metals through clay liners in remediation services. Additionally, the media described herein can be used as an active ingredient in activated sludge water treatment systems.

Moreover, the contaminant-sorption capacity of the media is greater than that of other materials used to treat contaminated fluids. For example, activated carbon was only effective at removing contaminants from four bed volumes of contaminated ground water (1 gallon of water being treated by 1 gallon of activated carbon), whereas the SULFATREAT XLP-based media described herein remained effective for over 1000 bed volumes, and, in some implementations, remained effective for about 5000 bed volumes. In other illustrative embodiments of the media described herein, the media remained effective for over 18,000 bed volumes and, in some implementations, over 27,000 bed volumes.

In addition to the benefits set forth above, the media, techniques, and methods disclosed herein include other advantages, as follows. A wide range of spent activated alumina, used iron sponge or other spent material is currently disposed of in landfills, which has a detrimental environmental impact. As described herein, such material can be used as a support substrate or matrix for the various types of active media disclosed herein. In some embodiments, spent alumina and used iron sponge material can be diverted from landfills to produce additional active media, thereby reducing the environmental impact that the spent alumina would have otherwise had.

The active media as described herein has a higher level of activity as compared to activated carbon. Thus, less media and smaller equipment can be used to treat certain fluid streams as compared to activated carbon-based systems. For example, a treatment system using the ferric sulfate/alumina media described herein requires about one-tenth the size of footprint required for an activated carbon-based system for treating groundwater with 2.5 ppb mercury contamination to a level of less than 20 ppt. Moreover, the higher activity of the media as compared to activated carbon permits the use of about one-tenth the amount of media in a treatment system. For example, in the ground water example immediately above, the media has an active life of about 1000 bed volumes, as compared to about four bed volumes for activated carbon.

Further, it is believed that embodiments of the disclosure permit the active compound to retain desirable characteristics, e.g., electrochemical and/or properties, while keeping the compound bound to the matrix. Thus, the active compound can act as a flocculation agent for contaminants, in that it can bind the contaminants, without requiring the additional steps of settling and filtering that typical flocculation agents require.

Figure 2:
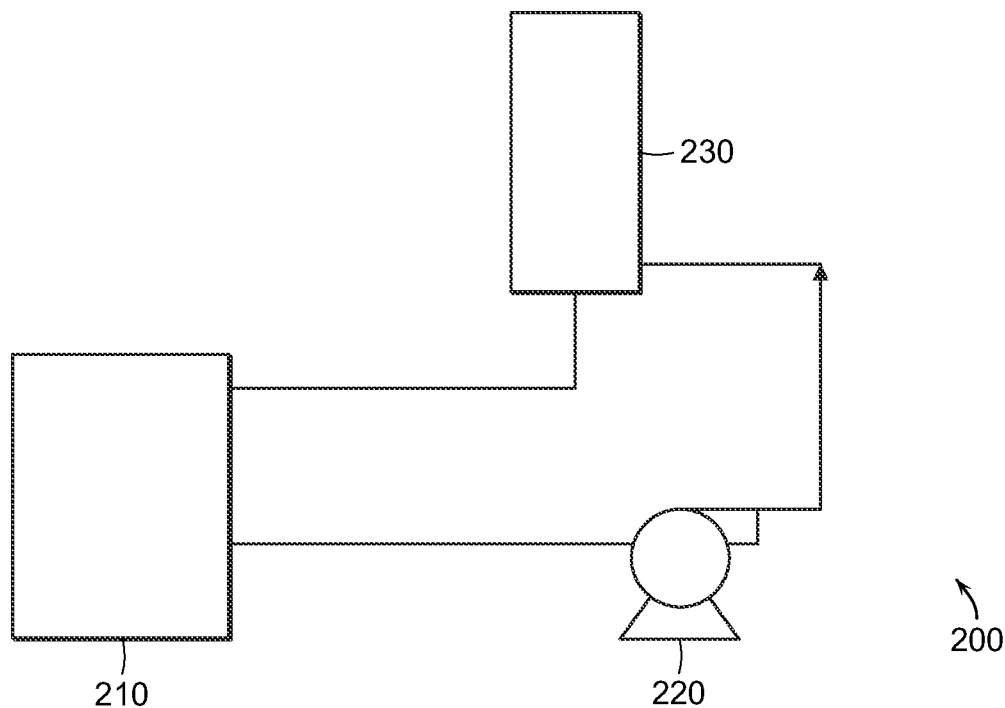
FIG. 2 shows an illustrative process for preparation of a pre-coat filter.

FIG. 2 shows an illustrative process 200 for preparation of a pre-coat filter using any of the medias described herein as well as the treatment materials described in the patents incorporated above. A vessel 210 is filled with a slurry mixture of 300 grams of active media of size 325 mesh in one gallon of water. A pump 220 circulates the slurry mixture from vessel 210 through a pre-coat filter of 30 microns or less at a rate of about 1 gallon per minute. The circulation continues until the slurry mixture is approximately clear, indicating that a quantity of the active media has been entrained into the pre-coat filter. The filter may then be used to reduce contaminant levels as set forth herein. Optionally, after the reduction of the contaminant levels, the spent media can be removed and/or replaced by a fresh active media.

Figure 3:
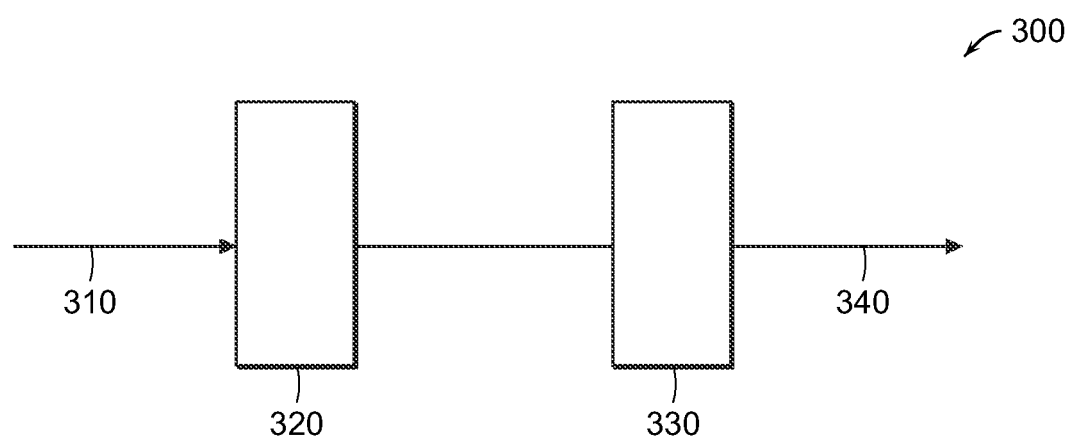
FIG. 3 shows an illustrative process for use of a pre-coat filter having an active media entrained.

FIG. 3 shows an illustrative process 300 for use of a pre-coat filter having an active media in a bed (e.g., any of the media set forth in the examples below). A contaminated stream 310 includes 2.5 ppb mercury and 25 ppb arsenic in water. Contaminated stream 310 is passed through a pretreatment filter 320 of 10 micron or less to remove particulate contaminants at a rate of 333 ml/min. The stream is then passed though pre-coat filter 330, prepared in accordance with process 200. Pre-coat filter 330 is expected to reduce the levels of mercury and arsenic in the water, as set forth above. An effluent stream 340 is expected to contain less than 20 ppt mercury and no detectable arsenic. It is understood that the contamination levels, contamination reduction amounts, and flow rates are illustrative only, and greater or lesser values are contemplated.

Figure 4:
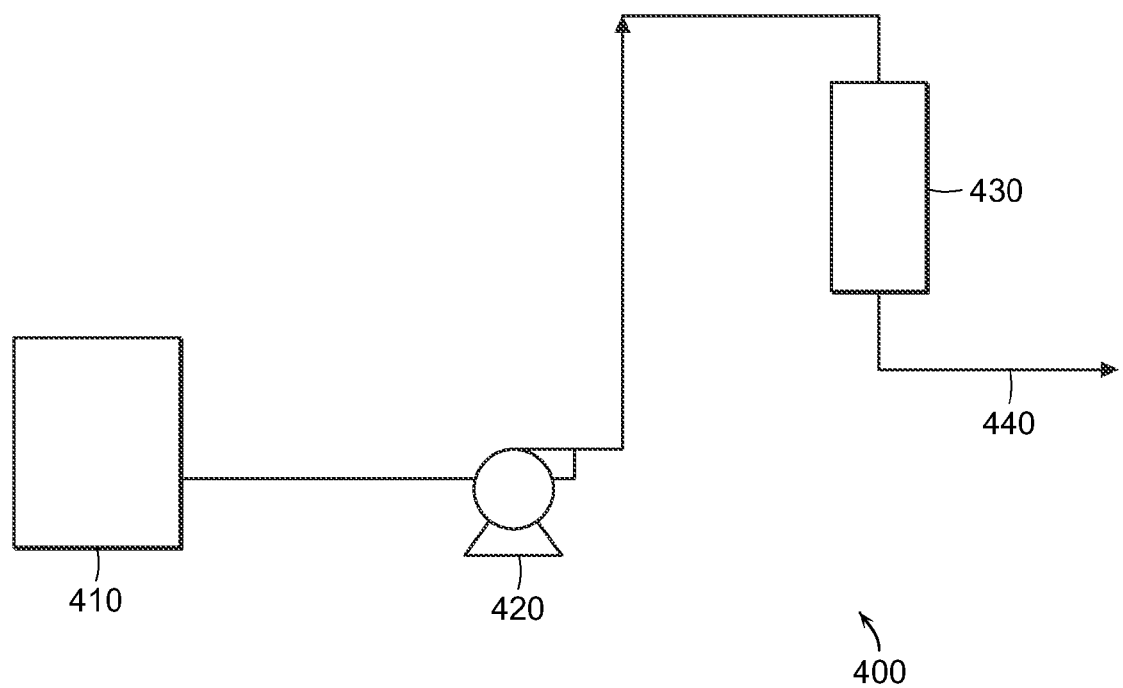
FIG. 4 shows an illustrative process for use of an active media to reduce contamination levels in a fluid.

FIG. 4 shows an illustrative process 400 for use of media #1, described below, to reduce contamination levels in a fluid. A vessel 410 contains contaminated water including 3000 ppt mercury and 25 ppb arsenic. A pump 420 passes the contaminated water from vessel 410 through a column 430 containing media #1. In one implementation, column 430 is about 25.08 centimeters long, having an inner diameter of about 0.5 centimeters, and contains about 4 grams of active media filling a section of the column about 4 centimeters in length. During continuous operation for at least 7 days at a flow rate of about 4 ml/minute, an effluent stream 440 contains less than 20 ppt mercury and no detectable arsenic. It is understood that the particular media used, contamination levels, contamination reduction amounts, and flow rates are illustrative only, and greater or lesser values are within the scope of the invention.

FIGS. 5A and 5B show a side view and a top view, respectively, of an illustrative apparatus 500 for use of any of the media described herein to reduce contamination levels in a fluid. A vessel 505 is continuously fed a contaminated fluid from inlet 510 to maintain a level of contaminated fluid in vessel 505. A drum 515 is partially submerged in the fluid in vessel 505 and rotates about a central axis. Drum 515 has a porous surface that has been coated with one or more selected media. Drum 515 also has an outlet 520, which is in fluid communication with the interior of the drum, and may include additional structures inside the drum, to allow fluid inside drum 515 to exit the drum. Vessel 505 also has a media inlet 525 or feeding a slurry of media in a fluid into vessel 505. In one illustrative implementation, the media can be added to the contaminated fluid upstream of apparatus 500 so that the media enters vessel 505 via inlet 510 along with the contaminated fluid. Apparatus 500 also includes a scrapper plate 530 in contact with drum 515.

As drum 515 rotates, a vacuum is drawn on outlet 520. The vacuum brings contaminated fluid through the porous surface of drum 515, on which is disposed the active media. Meanwhile, media that has contacted the contaminated fluid, used media 535, is removed from the surface of drum 515 by scrapper plate 530. Additional fresh active media, which was added by media inlet 525, is added to the surface of drum 515 when the bare drum surface resubmerges in the contaminated fluid in vessel 505. In this way, a continuous flow of contaminated fluid is treated with a continuously renewing supply of active media. The used media 535 can be removed for disposal.

In one or more embodiments, the methods and treatments as described herein increase the sulfate, sulfite, and sulfide content of the media. One analytical technique for measuring the elemental composition of a material is an ESCA (Electron Spectroscopy for Chemical Analysis) scan. An ESCA scan is an analytical technique used to look at the surface of materials. An ESCA scan is sensitive to the chemical state of the material being analyzed. For example, an ESCA scan can reveal the presence and relative proportions of sulfate, sulfide and sulfite in a material. Changes in horizontal position on the scan indicate a chemical shift, described in greater detail below. Changes in height indicate relative changes in amount of a particular substance in the material being analyzed. Chemical composition information provided herein is given in mol %.

In some implementations of the invention, the sulfate and sulfide contents of various support substrates increase in the following order: (unused and untreated material)<(unused and treated material)<(used and untreated material)<(used and treated material). In some embodiments, a used catalyst is treated with one or more $H_2S$, $H_2$, $N_2$, and/or air, which results in a significant increase in the sulfate and/or sulfide content. As used herein, the term "treated" refers to a catalyst (or other support substrate or matrix) that has been processed according to any of the illustrative embodiments of method 100 of making a sorption media.

Without being limited by any particular theory, it is believed that sulfur compounds act as the active species in reducing metal contaminant levels in fluid streams and the sulfate and sulfide or other sulfur containing compounds contained within the various medias correlate with the sorbing capacity of the media. The sorbing capacity increases with the increase of the contents of sulfate, sulfide, or other sulfur containing compounds. In one or more embodiments, the sulfide content contributes to a greater extent to the sorbing capacity of the media than the sulfate content. The content of sulfate and sulfide or other sulfur-containing compounds can be determined by measuring the molar percentage of sulfur in the sorption media. The molar percentage of sulfur can be calculated by the following formula:

Sulfur mol % =moles of sulfur atom in the media/total moles of all the atoms in the media (Formula I).

In some embodiments, the sulfur content is more than about 5.0 mol %. In some embodiments, the sulfur content is more than about 7.0 mol %. In some embodiments, the sulfur content is more than about 9.0 mol %.

The capacity of the sorption media can be measured by the amount of metal in the fluid stream absorbed by the media. In some embodiments, the capacity of the sorption media is measured by the weight of mercury (mg) in the aqueous stream absorbed by the media (in kilograms). The capacity of the sorption media can also be measured by the amount of inorganic mercury absorbed by the sorption media. Further still, the capacity of the sorption media can be measured by the amount of ionic mercury absorbed by the sorption media.

Depending on the species of mercury in the fluid stream (e.g., inorganic or ionic), a sorption media comprising different active compounds can be utilized to effect efficient level reduction of the multiple mercury species. In some embodiments, the fluid stream contains inorganic mercury and a sorption media including a sulfide species is used for reducing mercury levels. In other embodiments, the fluid stream contains ionic mercury and sorption media comprising sulfate is used for reducing the mercury levels.

Thus, another aspect of the invention includes identifying the type of contaminant species present in a fluid that is to be treated and selecting the active compound to be bonded or linked to a media that is best suited for reducing the level of the identified contaminant. For example, if it is determined that a fluid to be treated contains an ionic mercury contaminant, then a media including iron sulfate, aluminum sulfate, and/or copper sulfate (e.g., media #1 described below) is selected as best suited for removing said contaminant. In contrast, if the fluid contains both ionic and inorganic mercury contaminants, then a media including both sulfate and sulfide species (e.g., media #3 described below) is selected as best suited for removing said contaminants. Further still, a combination of media can be selected for use in treating a contaminated stream that has both ionic and inorganic mercury contamination wherein at least one media of the combination includes a sulfate species and at least one other media of the combination includes a sulfide species (e.g., media #1 and media #6 described below).

The following media and specific parameters for its manufacture are provided as illustrative examples of the media that can be prepared and used by the techniques disclosed herein.

It is understood that these examples are illustrative only, and other media and specific parameters for their manufacture are within the scope of the invention. For example, various temperatures, pressures, durations, component concentrations, materials, and material quantities are specified. It is understood that these parameters are illustrative and may be varied to achieve the desired media compositions.

Moreover, the specific parameters set forth in Tables 1-3 below describe processes for making the illustrative media in relatively small quantities. While it is thought these processes can be directly scaled to produce relatively large quantities of the desired media, other techniques for making relatively large quantities may use parameters that differ from those set forth in the Tables. Examples of the variability of such parameters are provided in the descriptions that follow.

In the examples below, a contaminant capacity of the media is provided. In order to determine the contaminant capacity, two methods were used. In the first method, called the "spin test" herein, 0.5 grams of the particular media was mixed with 0.25 liters of a standard solution (e.g., water containing a known initial concentration of a contaminant species). The media and standard solution was stirred for about five minutes at approximately 500-800 RPM using a magnetic stir plate. The media/solution mixture was then filtered through a 1.0-1.2 μm filter/vacuum apparatus (e.g., 47 mm, 1.2 μm Versapor Membrane Disc Filter with vacuum filtration). A contaminant analysis was then performed on the collected filtrate, and the media capacity determined by multiplying the difference between the initial contaminant concentration and final contaminant concentration by the volume of standard solution and then dividing by the weight of media used.

In the second contaminant capacity testing method, called the "column test" herein, a glass column that is approximately 1 cm inner diameter and 46 cm high is used. The column is filled with enough media to form a packed section of about 8-9 cm in height. Approximately 1 liter of a standard solution was pumped through the column at about 4 ml/min. The solution that passed through the column was collected, and the contaminant concentration therein was determined. The media capacity is determined by multiplying the difference between the initial contaminant concentration and final contaminant concentration by the volume of standard solution and then dividing by the weight of media used to form the packed section. Other column configurations, media quantities, and flow rates were also used to determine media contaminant capacity in which the contact time between the standard solution and media was approximately 2 minutes. In some tests, the flow of standard solution was halted before the media's ultimate capacity was achieved. In such cases, the capacity is reported as being at least that capacity achieved at the moment the test was halted.

All capacity testing data disclosed herein describes a media capacity for an ionic mercury species.

ILLUSTRATIVE EXAMPLE MEDIA #1

An active media, media #1, was prepared according to the method described in Table 1. The representative steps of method 100 are also listed in Table 1.

TABLE 1

Illustrative parameters for manufacture of media #1

| | |
|---|---|
| Media base (step 110) | Maxcel 740 virgin alumina Claus catalyst; target Net LOI at 1000° C. < 7%; macro porosity at 750 Å of greater than 0.1 cc/g |
| Media sizing (step 160) | Media was ground to sizing of 12 × 40 mesh prior to further processing |
| Active compound and solvent (step 120) | 10 grams ferric sulfate (purity of 99.9%) was dissolved in 100 ml distilled water at 70° C. |
| Media preparation for doping (step 140) | Media substrate was dried at 100-200° C. for 60-120 minutes; media was cooled to ambient temperature in air |
| Contact temperature, humidity, and contact time (step 130) | The dopant mixture was contacted with the dried substrate at 40° C. for 10-20 minutes until the dopant was absorbed (e.g., the media appeared wet) |
| Wash liquid, drying time, and drying temperature (step 140) | No wash step; doped substrate was dried for 2 hours at 200-400° C. |
| Second doping (step 130) | The dried media was re-doped with 10 grams ferric sulfate (purity of 99.9%) dissolved in 100 ml distilled water at 70° C. |
| Wash liquid, drying time, and drying temperature (step 140) | No wash step; doped substrate was dried for 2 hours at 100-200° C. |
| Reaction temperature, atmospheric composition, and reaction duration (step 150) | Media heated to 200° C. in the presence of 90 vol % $N_2$ and 10 vol % $H_2$ at a range of pressures up to 10 psig |
| Cooling (step 150) | Media was cooled in the presence of $H_2$ and $N_2$ at reaction ratios until the media reached 70° C. |

Figure 6:
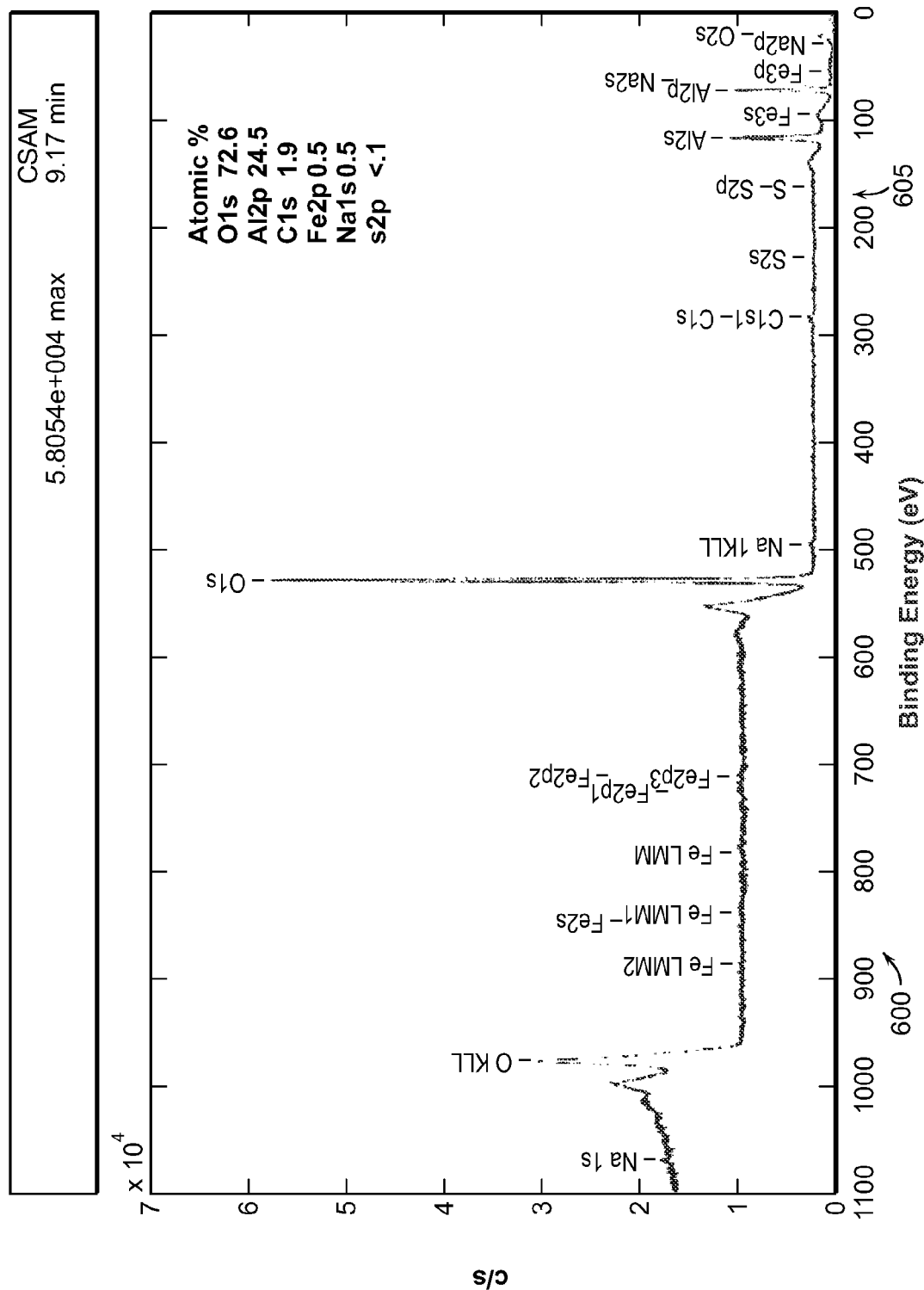
FIG. 6 shows a complete ESCA scan of a fresh Maxcel 740 catalyst (untreated and unused)

FIG. 6 shows a complete ESCA scan 600 of a sample of virgin Maxcel 740 alumina Claus catalyst (untreated and unused), which is available from Porocel of Little Rock, Ark. Maxcel 740 is an iron-doped alumina catalyst. As shown in FIG. 6, there is no sulfur in this virgin catalyst, which would appear in area 605 (in approximately the 176-154 eV range). The composition of the virgin catalyst includes approximately 72.6% oxygen, 24.5% aluminum, 0.5% iron, and 0.5% sodium. The capacity of this material as a media was 0 mg-mercury/kg-media.

Figure 7:
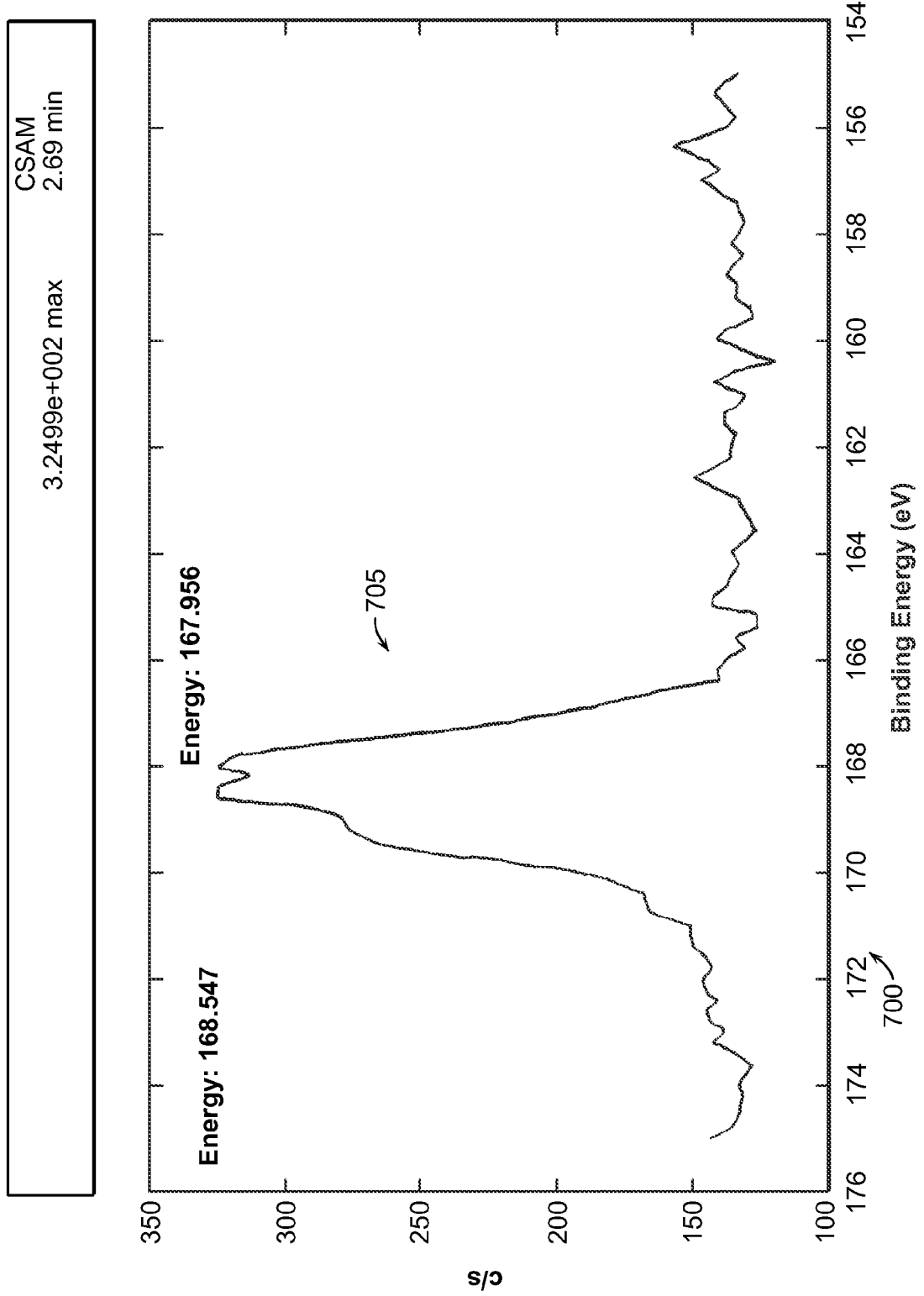
FIG. 7 shows an ESCA scan of a fresh Maxcel 740-based sorption media after it has been doped and reacted (treated and unused)

After the virgin catalyst was treated according to method 100 using the parameters set forth in Table 1, an ESCA scan was performed on a sample of the resulting media #1. FIG. 7 shows an ESCA scan 700 of a sample of media #1. The ESCA scan indicates that at least one sulfur species is present, as shown by peak 705. The composition of a sample of media #1 includes approximately 66.8% oxygen, 10.6% aluminum, 5.7% sulfur, and 9.6% iron. The sulfur exists as nearly 100% sulfate species. The capacity of a sample of media #1, as determined by a spin test, was determined to be about 340 mg-mercury/kg-media.

Figure 8:
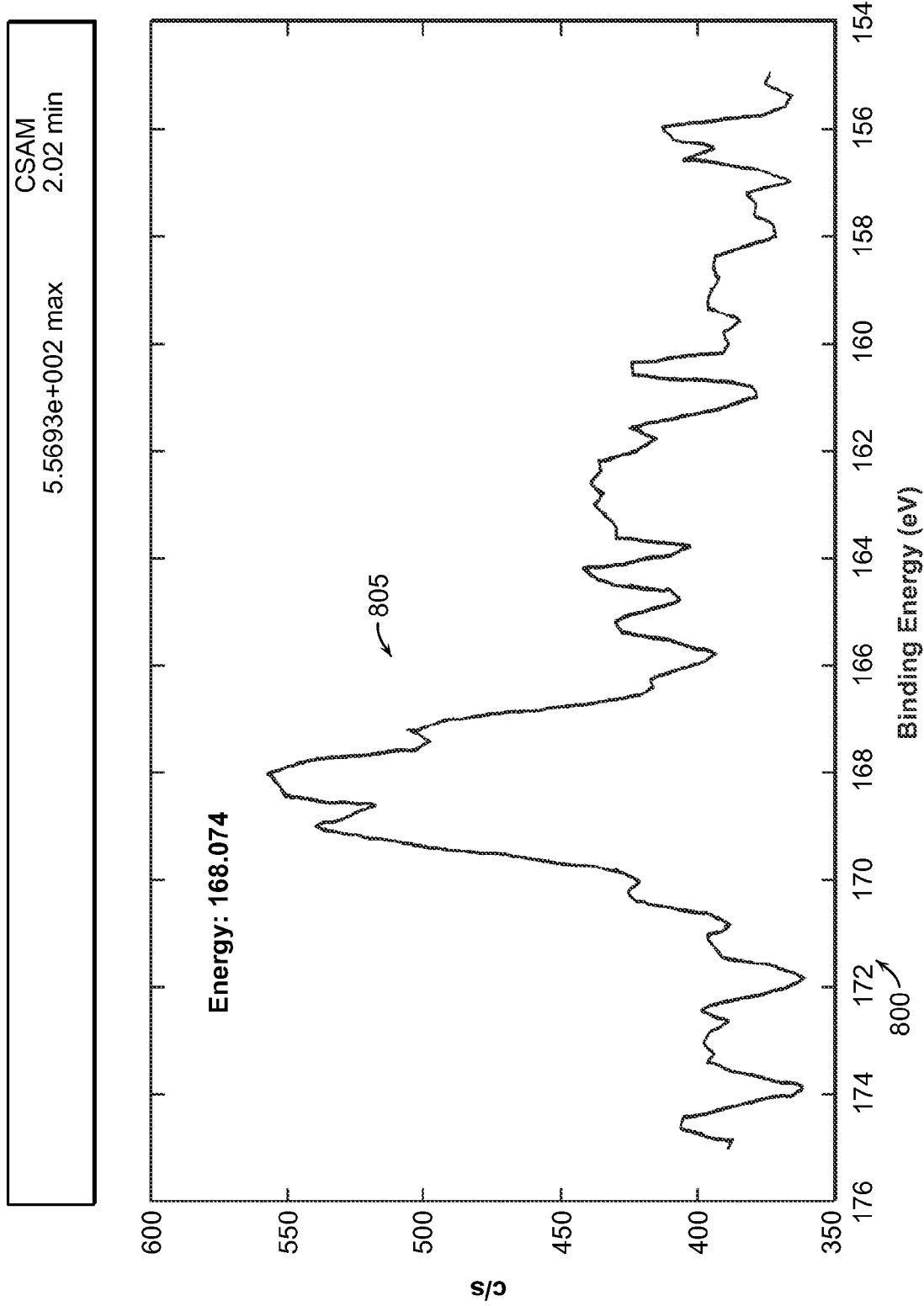
FIG. 8 shows an ESCA scan of a fresh Maxcel 740-based sorption media after it has been doped, reacted (treated and unused), and washed with water.

FIG. 8 shows an ESCA scan 800 of a sample of media #1 after it has been washed with water. The ESCA scan shows that the sulfur species was still present after washing (peak 805), thereby suggesting the sulfur species is bound or linked to the support substrate in some way. The composition of a sample of media #1 after washing includes approximately 68.8% oxygen, 24.2% aluminum, 1.4% sulfur, and 1.4% iron. The sulfur exists as about 90% sulfate species and 10% sulfide species. The capacity of samples of this media #1 after washing, as determined by a spin test, ranged from about 330 mg-mercury/kg-media to about 724 mg-mercury/kg-media and about 436 mg-arsenic/kg-media. One sample of the media #1 demonstrated a ferric sulfate loss of 2000 µg-Fe/L of wash water.

Figure 9:
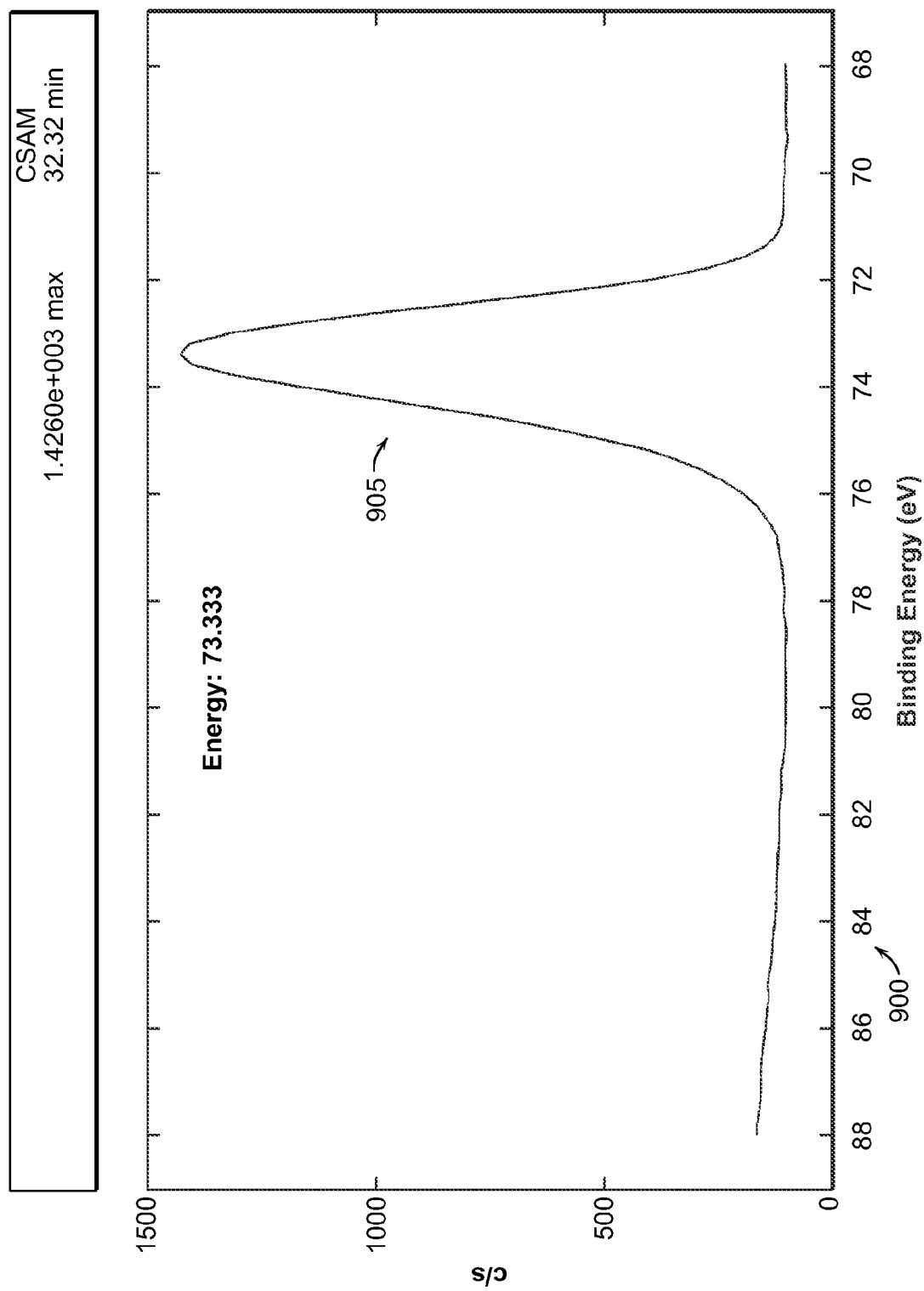
FIG. 9 shows an ESCA scan, in the aluminum region, of a fresh Maxcel 740 catalyst (untreated and unused)
Figure 10:
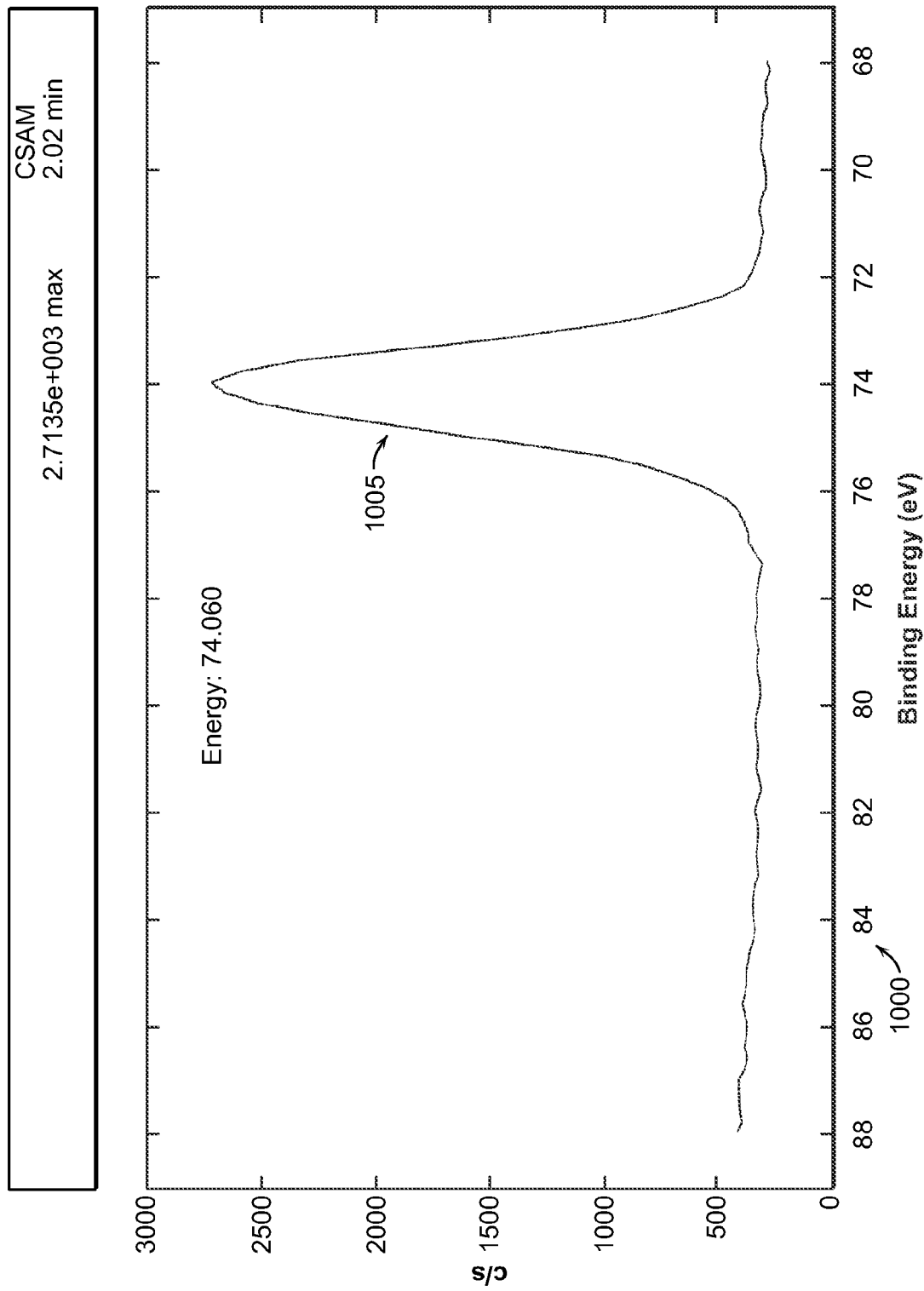
FIG. 10 shows an ESCA scan, in the aluminum region, of a fresh Maxcel 740-based sorption media after it has been doped and reacted (treated and unused)

FIG. 9 shows another ESCA scan 900 of a sample of virgin Maxcel 740 alumina Claus catalyst (untreated and unused), focusing on the region of about 88-68 eV. Likewise, FIG. 10 shows another ESCA scan 1000 of a sample of media #1, also focusing on the region of about 88-68 eV. These two scans show a shift in the aluminum peak from about 73.333 eV in the virgin Maxcel 740 alumina sample (peak 905) to about 74.060 eV in the media #1 sample (peak 1005). This energy shift is believed to be due to interactions between the alumina support substrate and the reactants introduced by the various implementations of method 100, e.g., as performed in accordance with the parameters set forth in Table 1. For example, sulfur may be substituting for oxygen in part of the alumina and/or iron oxide matrix of the support substrate (e.g., due to a covalent and/or ionic bond). It is theorized that this interaction is responsible, at least in part, for the reduction in the loss of the active compound from the support substrate when the media is used to treat contaminated fluids and the resulting retention of the contaminant species.

As stated generally herein, the parameters in Table 1 can be varied to achieve desired media. For example, during the reaction step (150), the hydrogen concentration can be varied from 3-10 vol %, and the nitrogen concentration can be varied from 50-95%. Also, hydrogen sulfide, in concentrations varying from 2-5 vol %, and air, in concentrations varying from 0-35 vol %, can also be used. Furthermore, the reaction temperature can vary from 150-400° C., and the reaction time can vary from 0.5-2.0 hours. The active compound can vary from 5-20 wt % in the dopant mixture.

ILLUSTRATIVE EXAMPLE MEDIA #2

Figure 11:
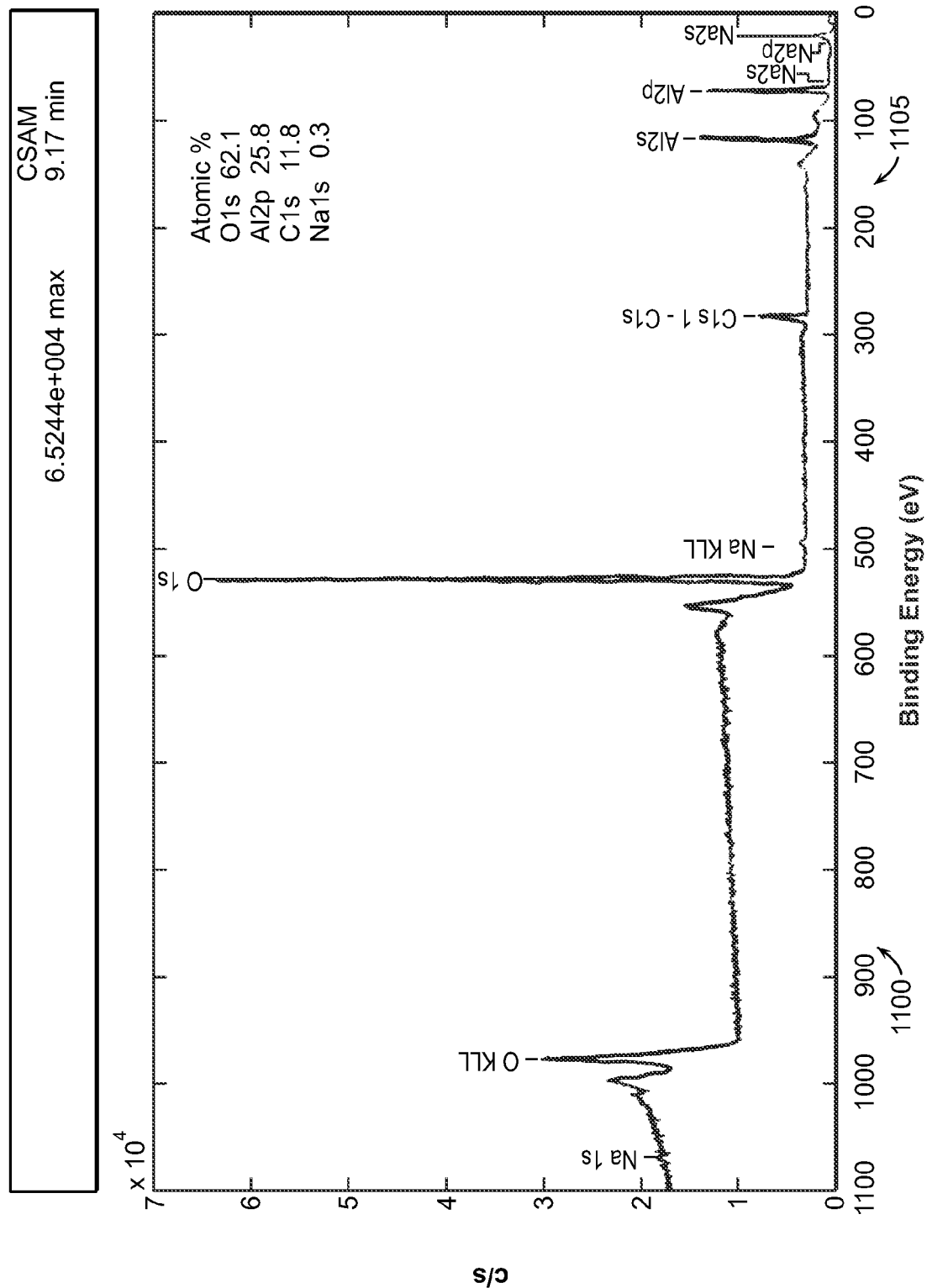
FIG. 11 shows an ESCA scan of a spent alumina catalyst that was used during the manufacture of hydrogen peroxide (untreated and used)

An active media, media #2, was prepared according to certain steps of the method described in Table 1. However, a spent alumina catalyst that was used in the production of hydrogen peroxide was used as the media base in place of the Maxcel 740 material (the alumina catalyst was a low sodium Alcan catalyst available from Arkema, Inc. of Philadelphia, Pa.). In addition, the second doping step and wash steps were omitted. Also, a mixture of hydrogen and hydrogen sulfide was used during the reaction step in place of the nitrogen and hydrogen. All other steps in the process remained essentially the same as used to produce media #1. FIG. 11 shows a complete ESCA scan 1100 of a spent alumina-based catalyst used in the product of hydrogen peroxide. As shown in FIG. 11, there is no sulfur in this used catalyst, which would appear in area 1105 (in approximately the 176-154 eV range). The composition of the spent catalyst includes approximately 62.1% oxygen, 25.8% aluminum, 11.8% carbon, and 0.3% sodium. The capacity of this material as a media was 0 mg-mercury/kg-media.

Figure 12:
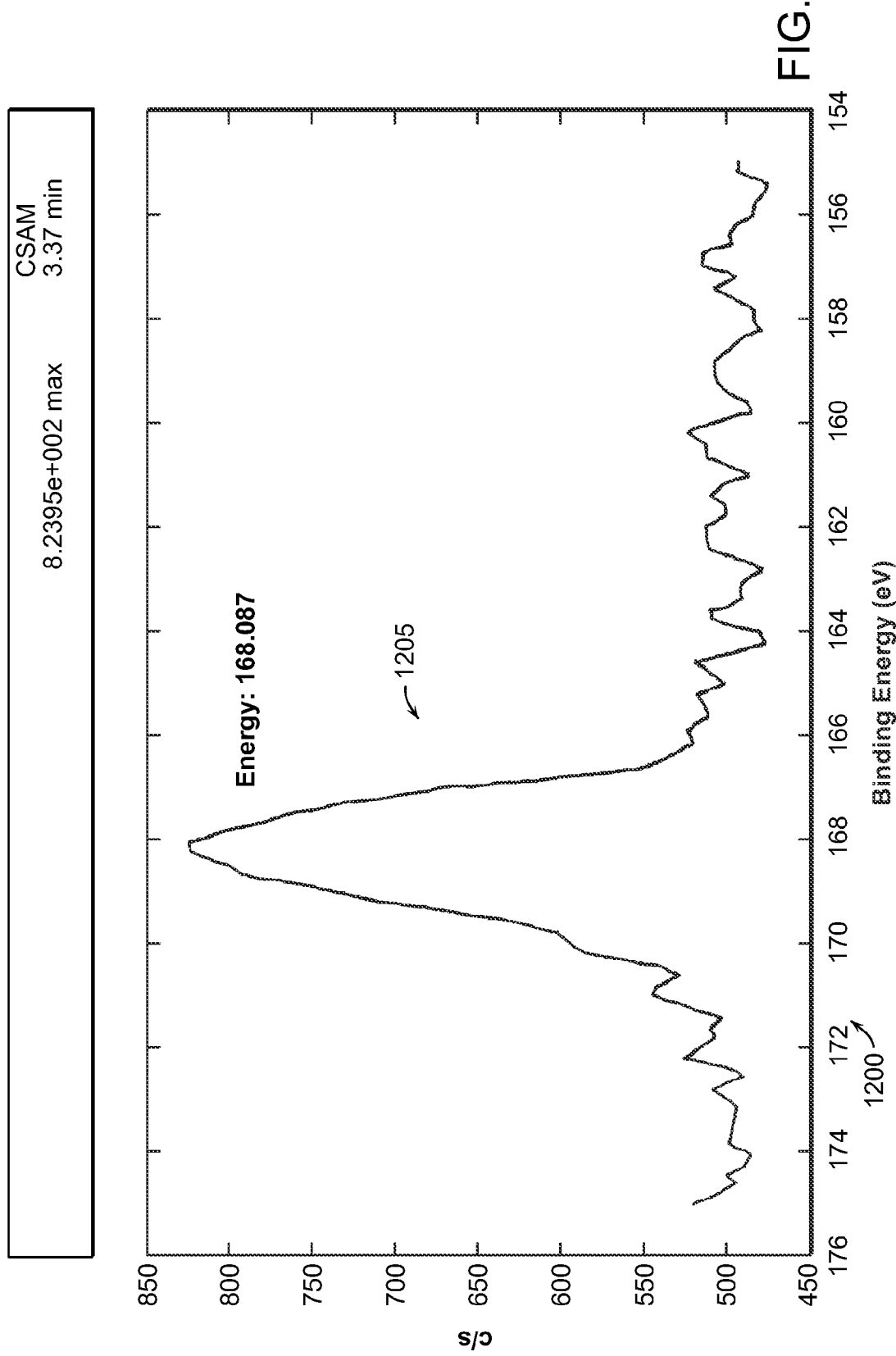
FIG. 12 shows an ESCA scan of a sorption media that is based on a doped spent alumina catalyst from the manufacture of hydrogen peroxide (treated and used)

After the spent alumina catalyst was treated according to method 100 using the parameters set forth in Table 1 (excluding the omitted steps), an ESCA scan was performed on a sample of the resulting media #2. FIG. 12 shows an ESCA scan 1200 of a sample of media #2. The ESCA scan indicates that at least one sulfur species is present, as shown by peak 1205. The composition of a sample of media #2 includes approximately 53% oxygen, 16% aluminum, 1.6% sulfur, 2.8% iron, and 26.7% carbon. The sulfur exists as nearly 100% sulfate species. The capacity of a sample of media #2, as determined by a spin test, was determined to be about 221 mg-mercury/kg-media.

Figure 13:
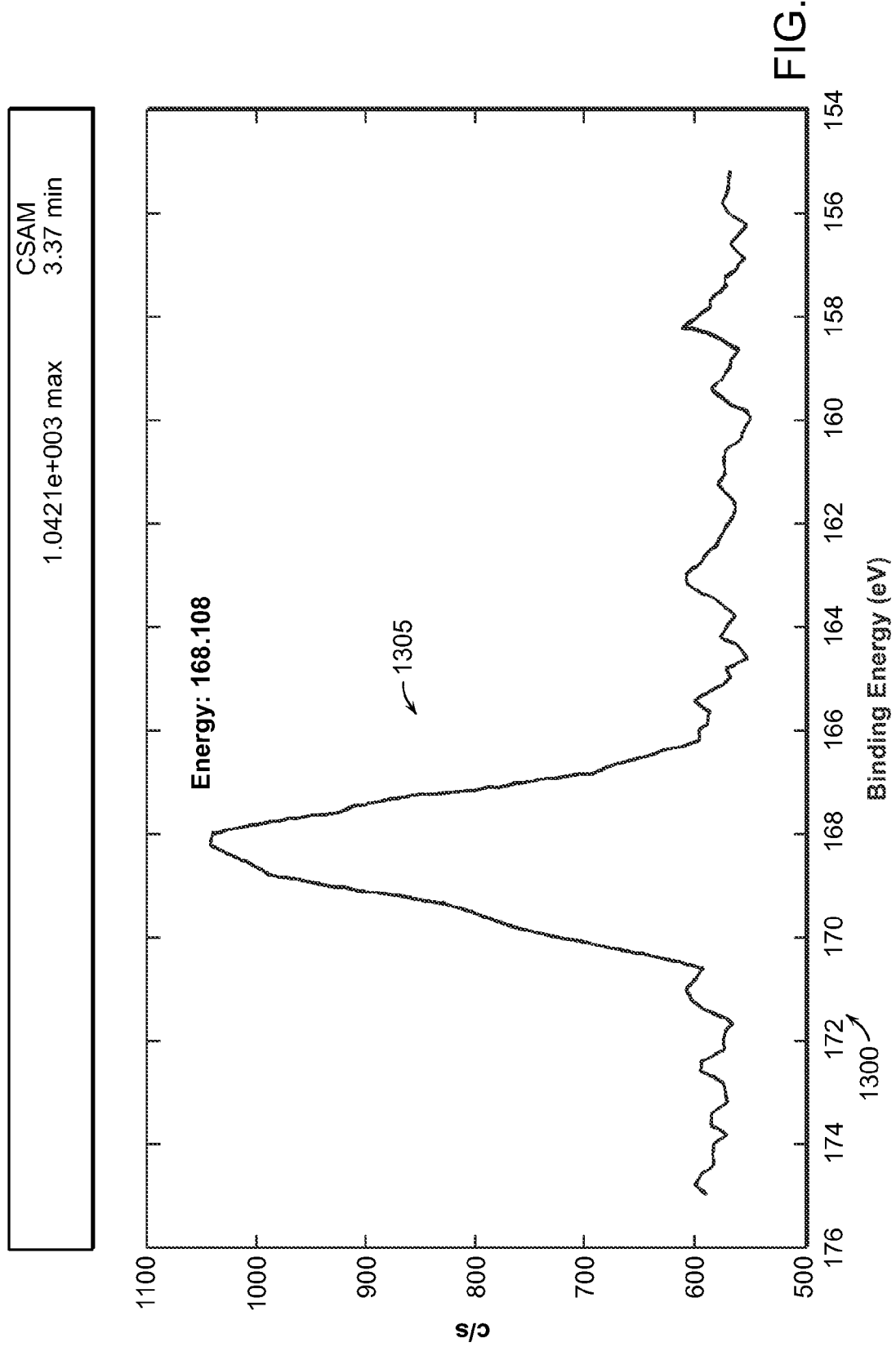
FIG. 13 shows an ESCA scan of a sorption media that is based on a doped spent alumina catalyst from the manufacture of hydrogen peroxide (treated and used), after being washed with water.

FIG. 13 shows an ESCA scan 1300 of a sample of media #2 after it has been washed with water. The ESCA scan shows that the sulfur species was still present after washing (peak 1305), thereby suggesting the sulfur species is bound or linked to the support substrate in some way. The composition of a sample of media #2 after washing includes approximately 58% oxygen, 16.3% aluminum, 1.6% sulfur, 1.3% iron, and 22.8% carbon. The sulfur exists as about 100% sulfate species. The capacity of a sample of this media #2 after washing, as determined by a spin test, was about 113 mg-mercury/kg-media.

ILLUSTRATIVE EXAMPLE MEDIA #3

An active media, media #3, was prepared according to the method described in Table 2. The representative steps of method 100 are also listed in Table 2.

TABLE 2

Illustrative parameters for manufacture of media #3

| | |
|---|---|
| Media base (step 110) | Maxcel 740 virgin alumina Claus catalyst; target Net LOI at 1000° C. < 7%; macro porosity at 750 Å of greater than 0.1 cc/g |
| Wash liquid, drying time, and drying temperature (step 140) | The substrate is dried for up to 1 hours at 150° C. in a vacuum |
| Reaction temperature, atmospheric composition, and reaction duration (step 150) | The substrate is heated to 200° C./in up to 30 vol % $H_2S$, 5 vol % $H_2$, and 75 vol % $N_2$ at a range of pressures up to 10 psig for up to 5 hours |
| Cooling (step 150) | The media is cooled in the presence of $H_2S$, $H_2$, and $N_2$ at reaction ratios until the media is 70° C. |
| Final media size (step 160) | Media is sieved to isolate suitable particles in the 12 × 40 range; larger particles are ground to particles approximately 12 × 40, 40 × 60, −100 mesh; substrate/media may be ground before or after the reaction and cooling steps |

Figure 14:
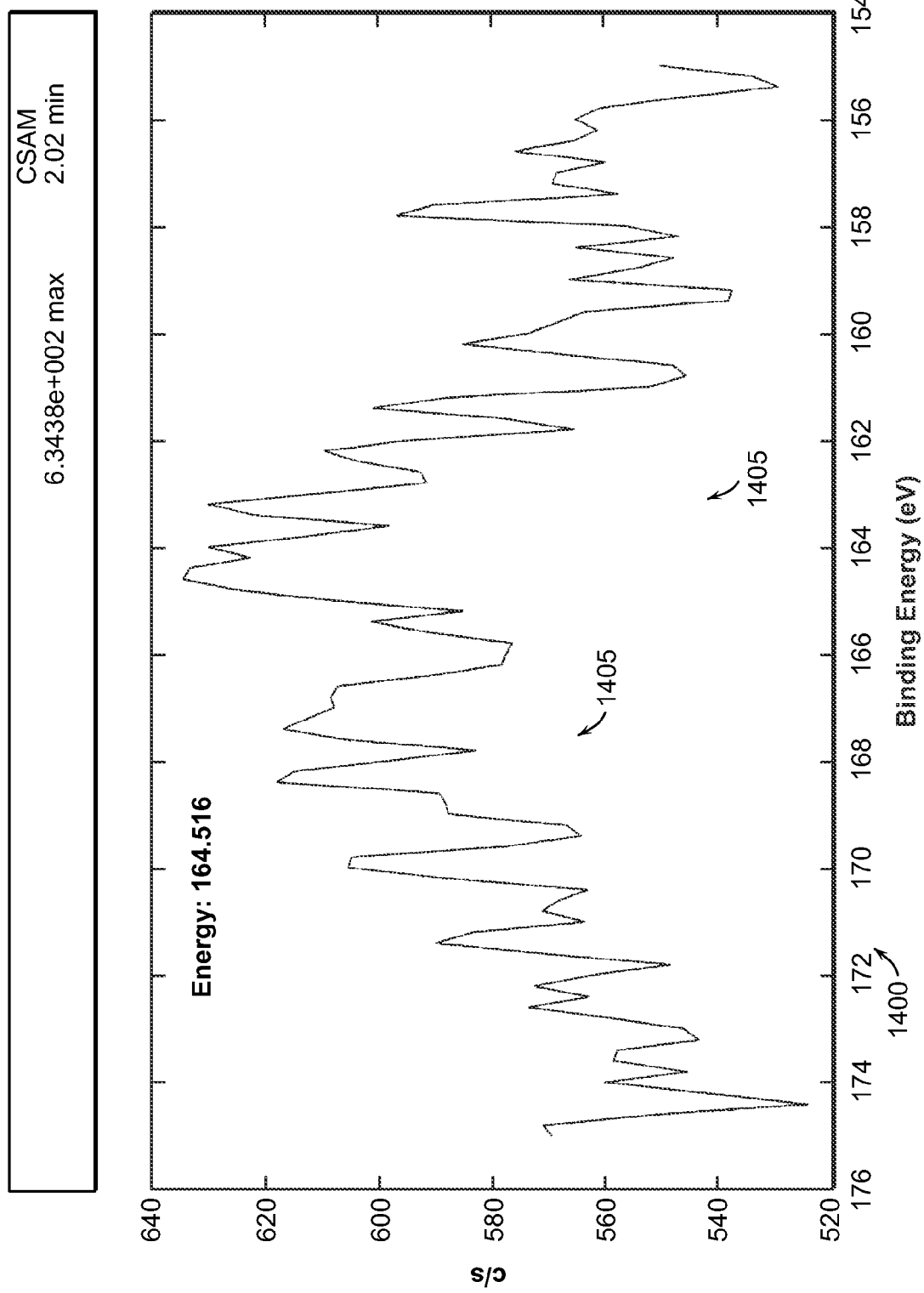
FIG. 14 shows an ESCA scan of a fresh Maxcel 740-based sorption media after it has been doped and reacted (treated and unused)

After the virgin catalyst was treated according to method 100 using the parameters set forth in Table 2, an ESCA scan was performed on a sample of the resulting media #3. FIG. 14 shows an ESCA scan 1400 of a sample of media #3. The ESCA scan indicates that at least one sulfur species is present, as shown by peaks 1405. The composition of a sample of media #3 includes approximately 69.5% oxygen, 28.2% aluminum, 0.2% sulfur, and 2.1% carbon. The sulfur exists as about 50% sulfate species and 50% sulfide species. The capacity of a sample of media #3, as determined by a spin test, was determined to be about 763 mg-mercury/kg-media.

As stated generally herein, the parameters in Table 2 can be varied to achieve desired media. For example, during the reaction step (150), the hydrogen sulfide concentration can be varied from 2-5 vol %, the hydrogen concentration can be varied from 3-10 vol %, the nitrogen concentration can be varied from 50-95 vol %, and the air concentration can be varied from 0-35 vol %. Furthermore, the reaction temperature can be varied from 120-400° C., and the reaction time can be varied from 1-5 hours.

ILLUSTRATIVE EXAMPLE MEDIA #4

An active media, media #4, was prepared according to the method described in Table 2. However, a SULFATREAT XLP material (available from M-I SWACO of Houston, Tex.), with sizing capability in US mesh sizes of 12 to 100, was used as the media base in place of the Maxcel 740 material. All other steps in the process remained essentially the same as used to produce media #3.

Figure 15:
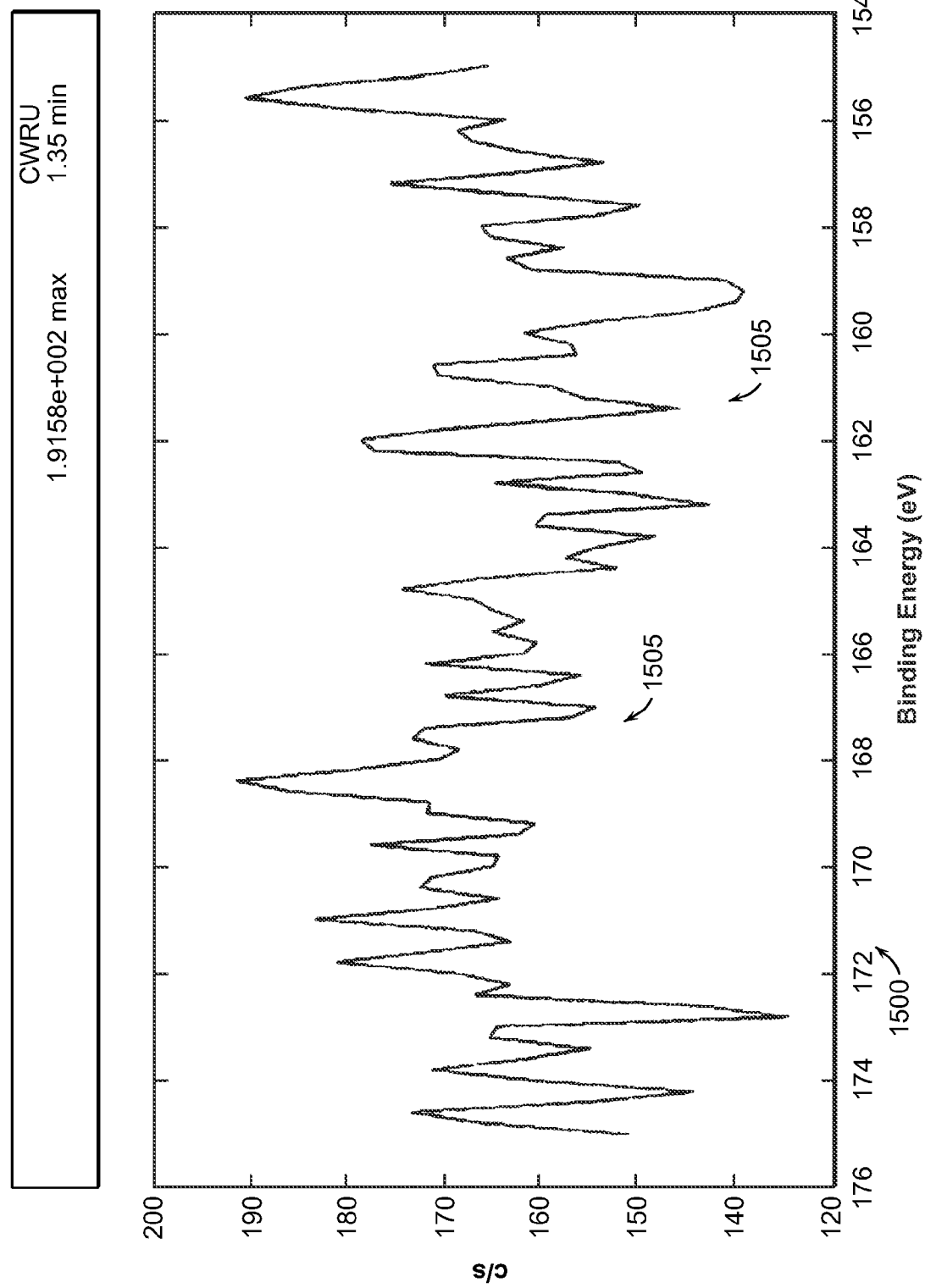
FIG. 15 shows an ESCA scan of a fresh SULFATREAT XLP-based sorption media (untreated and unused)

FIG. 15 shows an ESCA scan 1500 of a sample of virgin SULFATREAT XLP material (untreated and unused). As shown in FIG. 15, there is very little sulfur in this virgin catalyst, which would appear in areas 1505 of the ESCA scan. The composition of the virgin material includes approximately 50% oxygen, 0.3% aluminum, 0.1% sulfur, 10.6% iron, 35.1% carbon, and 3.8% silicon. The sulfur species exists as nearly 100% sulfate.

Figure 16:
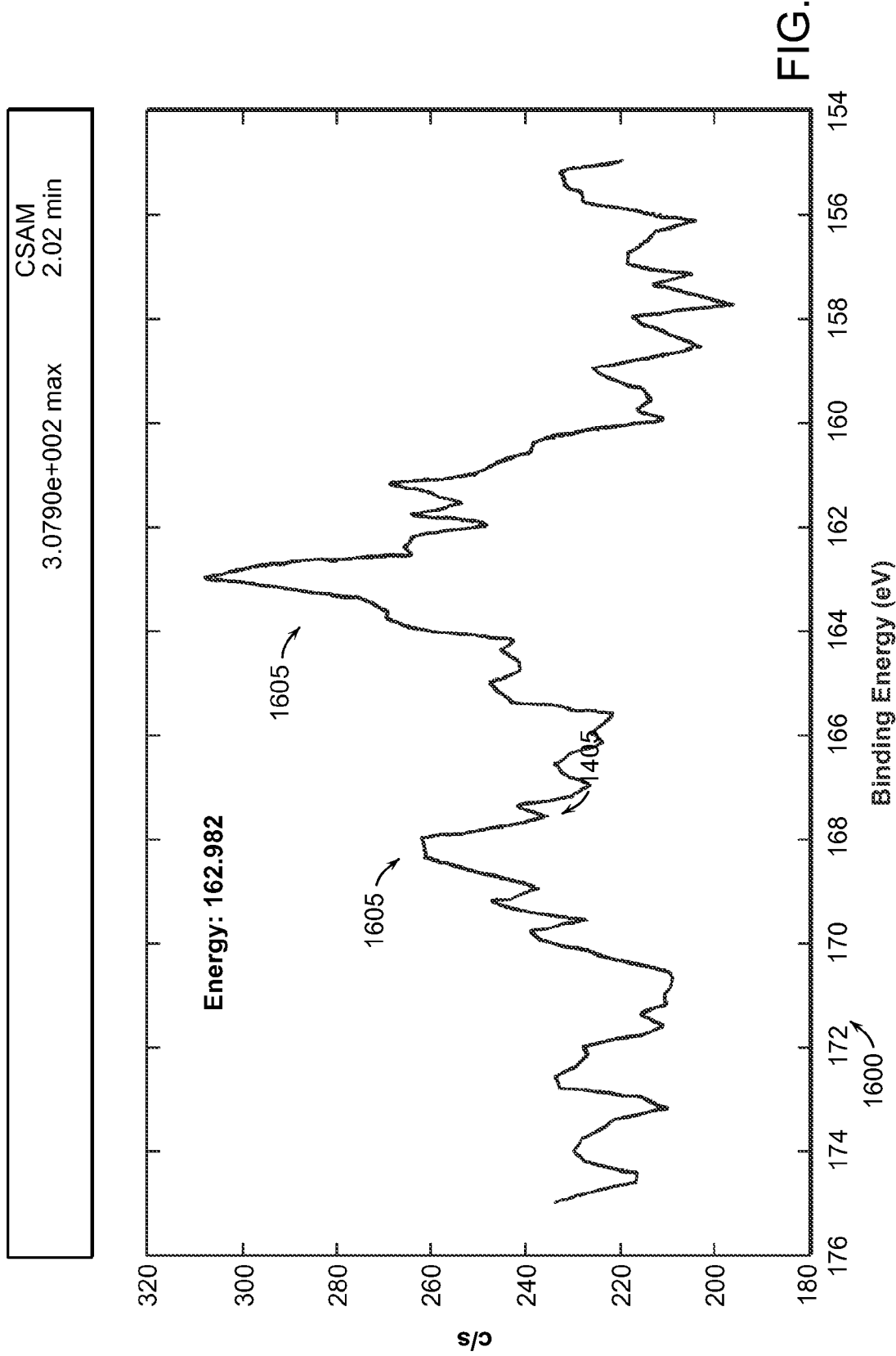
FIG. 16 shows an ESCA scan of a fresh SULFATREAT XLP-based sorption media after it has been reacted (treated and unused)

After the virgin material was treated according to method 100 using the parameters set forth in Table 2, an ESCA scan was performed on a sample of the resulting media #4. FIG. 16 shows an ESCA scan 1600 of a sample of media #4. The ESCA scan indicates that sulfur species are present, as shown by peaks 1605. The composition of a sample of media #4 includes approximately 49.6% oxygen, 0.4% aluminum, 3.4% sulfur, 13.7% iron, 28.5% carbon, and 4.4% silicon. The sulfur exists as about 30% sulfate species and about 70% sulfide species. The capacity of samples of media #4, as determined by a spin test, ranged from about 1011 mg-mercury/kg-media to 1127 mg-mercury/kg-media. Meanwhile, the capacity of samples of media #4, as determined by a column test, ranged from at least 2759 mg-mercury/kg-media to at least 3822 mg-mercury/kg-media. The capacity of another sample of media #4, as determined by a column test of extended duration, was at least 12,238 mg-mercury/kg-media (for an equivalent effective treatment life of over 27,434 bed volumes).

Figure 17:
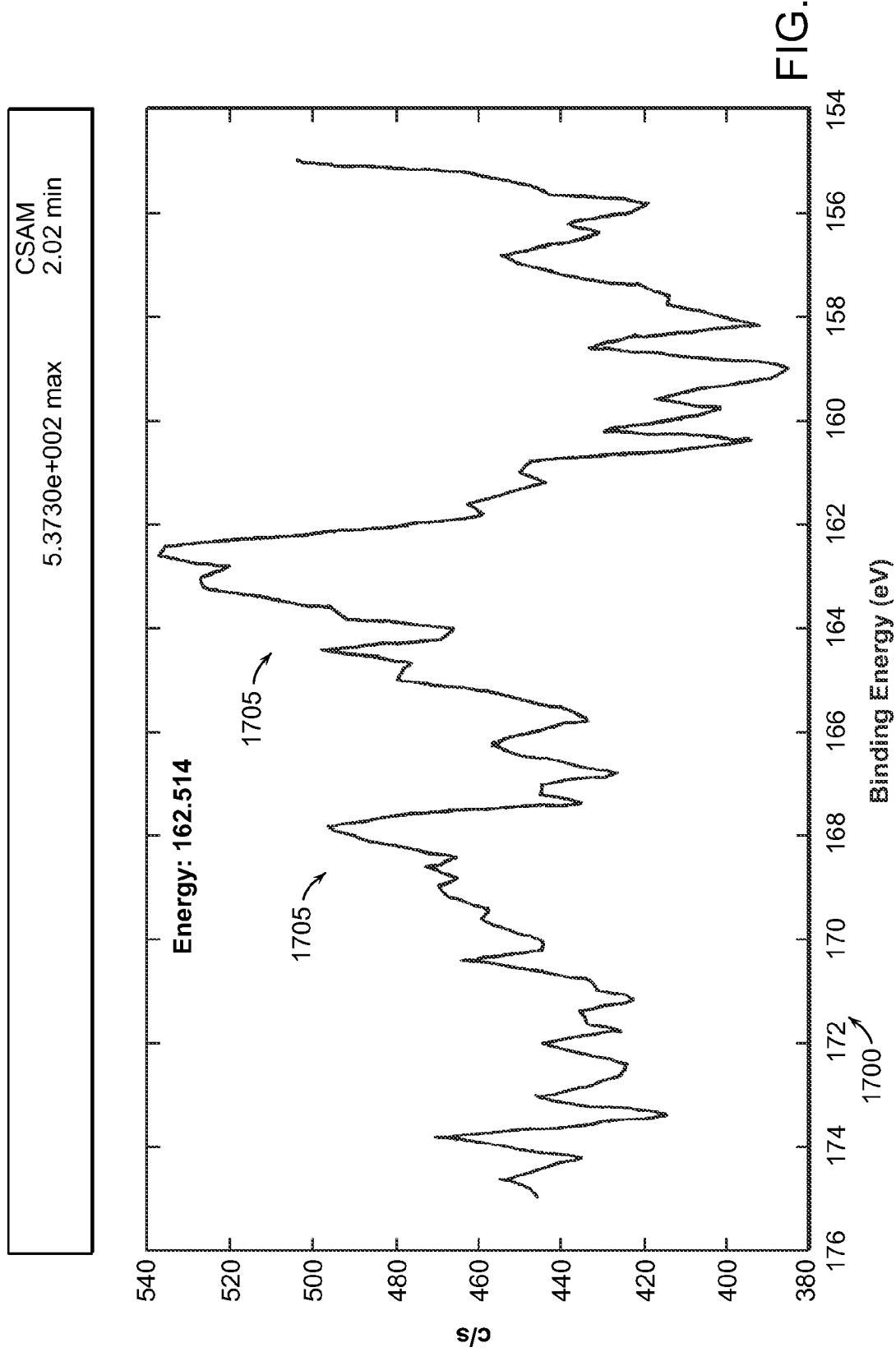
FIG. 17 shows an ESCA scan of a fresh SULFATREAT XLP-based sorption media after it has been reacted (treated and unused), after being washed with water.

FIG. 17 shows an ESCA scan 1700 of a sample of media #4 after it has been washed with water. The ESCA scan shows that the sulfur species were still present after washing (peak 1705), thereby suggesting the sulfur species is bound or linked to the support substrate in some way. The composition of a sample of media #4 after washing includes approximately 51% oxygen, 0.5% aluminum, 1.7% sulfur, 10.9% iron, 28.5% carbon, 6.4% silicon, and 0.9% Ca. The sulfur exists as about 20% sulfate species and 80% sulfide species. The capacity of a sample of this media #4 after washing, as determined by a spin test, was about 445 mg-mercury/kg-media.

ILLUSTRATIVE EXAMPLE MEDIA #5

An active media, media #5, was prepared according to the method described in Table 2. However, a spent SULFATREAT XLP material, which had been used to remove hydrogen sulfide from natural gas, was used as the media base in place of the Maxcel 740 material. All other steps in the process remained essentially the same as used to produce media #3.

Figure 18:
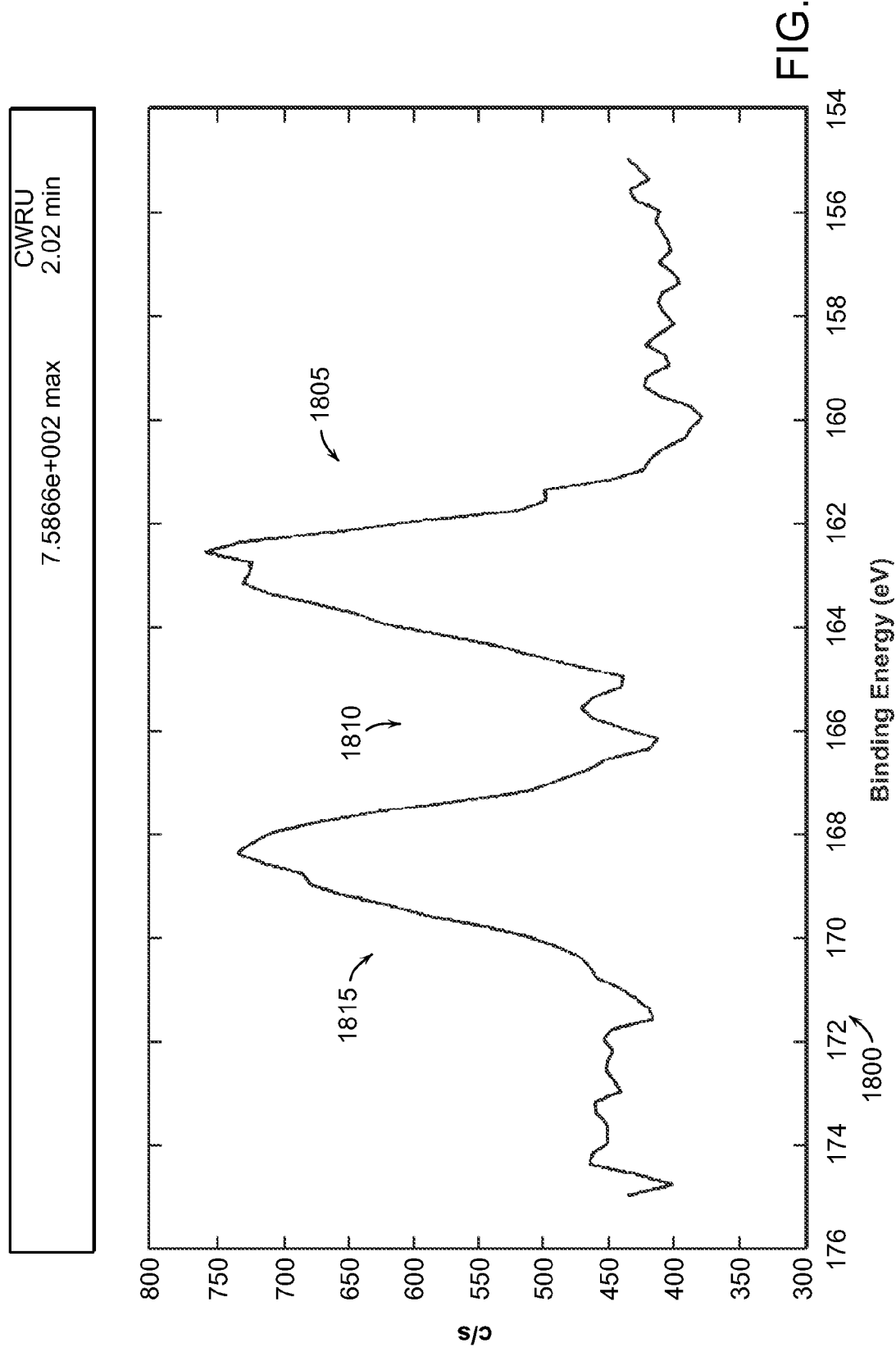
FIG. 18 shows an ESCA scan of a spent SULFATREAT XLP-based material (used and untreated)

FIG. 18 shows an ESCA scan 1800 of a sample of spent SULFATREAT XLP material (untreated and used). As shown in FIG. 18, several sulfur species exist in the spent material, as shown by peaks 1805 (corresponding to sulfide), 1810 (corresponding to sulfite), and 1815 (corresponding to sulfate). The composition of the spent material includes approximately 49.6% oxygen, 0.8% aluminum, 5.3% sulfur, 8.7% iron, 29.3% carbon, 4.6% silicon, and 1.7% chlorine. The sulfur species exists as nearly equal portions of sulfate and sulfide, with trace amount of sulfite. The capacity of samples of this media #5, as determined by a spin test, ranged from about 332 mg-mercury/kg-media to about 1025 mg-mercury/kg-media.

Figure 19:
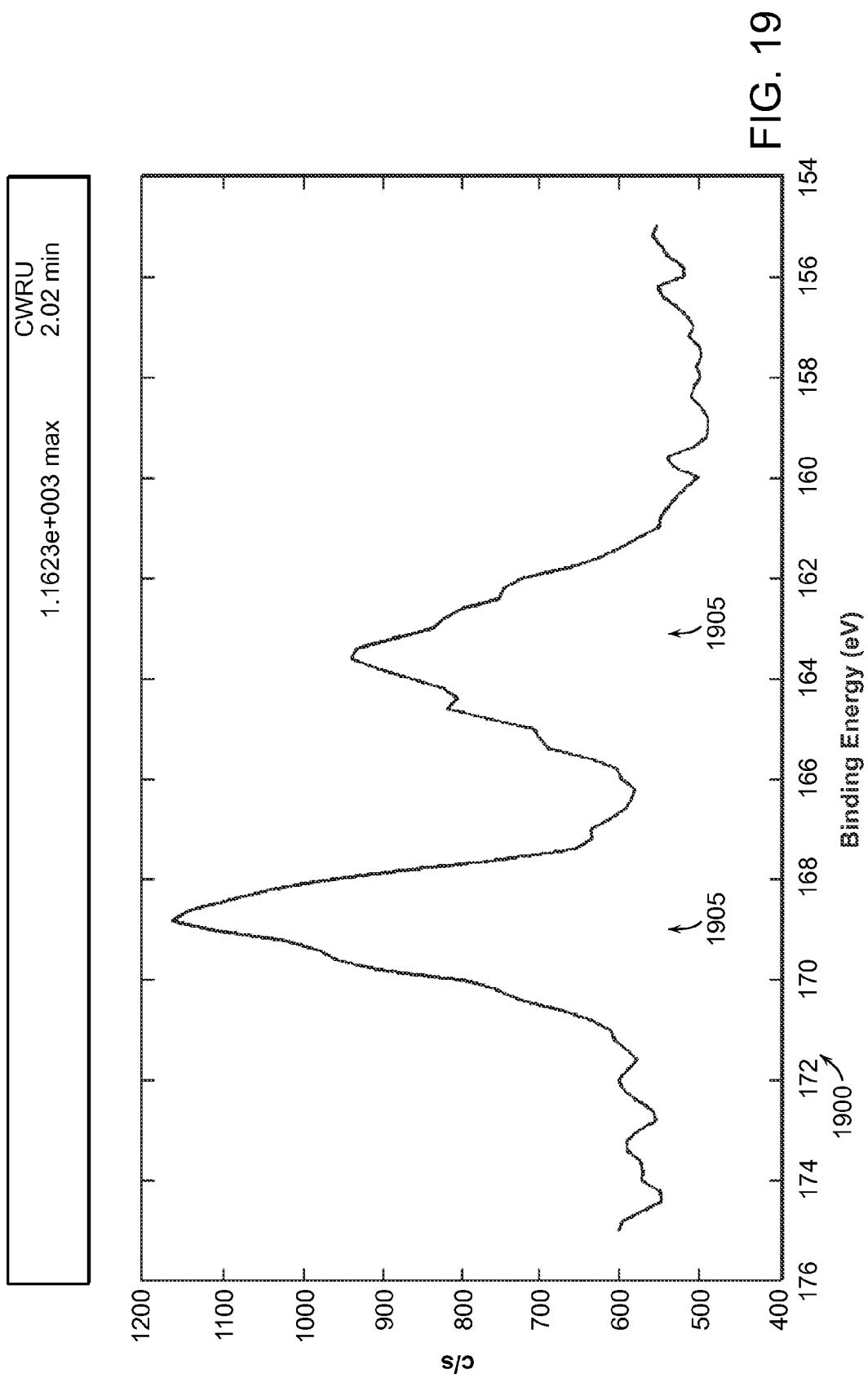
FIG. 19 shows an ESCA scan of a spent SULFATREAT XLP-based sorption media (used and treated)

After the spent SULFATREAT XLP material was treated according to method 100 using the parameters set forth in Table 2, an ESCA scan was performed on a sample of the resulting media #5. FIG. 19 shows an ESCA scan 1900 of a sample of media #5. The ESCA scan indicates that sulfur species are present, as shown by peaks 1905. The amount of sulfur species present increased relative to the used SULFATREAT XLP alone. The composition of a sample of media #5 includes approximately 50.4% oxygen, 1.2% aluminum, 7.3% sulfur, 9.3% iron, 25.8% carbon, 3.2% silicon, 1.3% chlorine, 0.8% calcium, and 0.7% sodium. The sulfur exists as about 60% sulfate species and about 40% sulfide species. The capacity of a sample of media #5, as determined by a spin test, was about 1924 mg-mercury/kg-media.

ILLUSTRATIVE EXAMPLE MEDIA #6

An active media, media #6, was prepared according to the method described in Table 3. The representative steps of method 100 are also listed in Table 3.

TABLE 3

| Illustrative parameters for manufacture of media #6 | |
| --- | --- |
| Media base (step 110) | Maxcel 740 virgin alumina Claus catalyst; target Net LOI at 1000° C. < 7%; macro porosity at 750 Å of greater than 0.1 cc/g |
| Media sizing (step 160) | Media is ground to sizing of 12 × 40 mesh prior to further processing |
| Mixing (step 130) | Sulfur powder (−100 US mesh and 99.9% pure) is added and physically mixed with the alumina substrate; concentration can range from 15-35 wt % |
| Drying (step 140) | The mixture is heated to 120° C. for 30 minutes |
| Reaction temperature, atmospheric composition, and reaction duration (step 150) | The mixture of substrate and sulfur is reacted with $H_2S$ (less than 5 vol %), $H_2$ (20 vol %), the balance $N_2$ for up to 90 minutes at 250° C. at pressures up to 10 psig |
| Cooling (step 150) | Media is cooled in the presence of $H_2S$, $H_2$, and $N_2$ at reaction ratios until the media is 70° C. |

Figure 20:
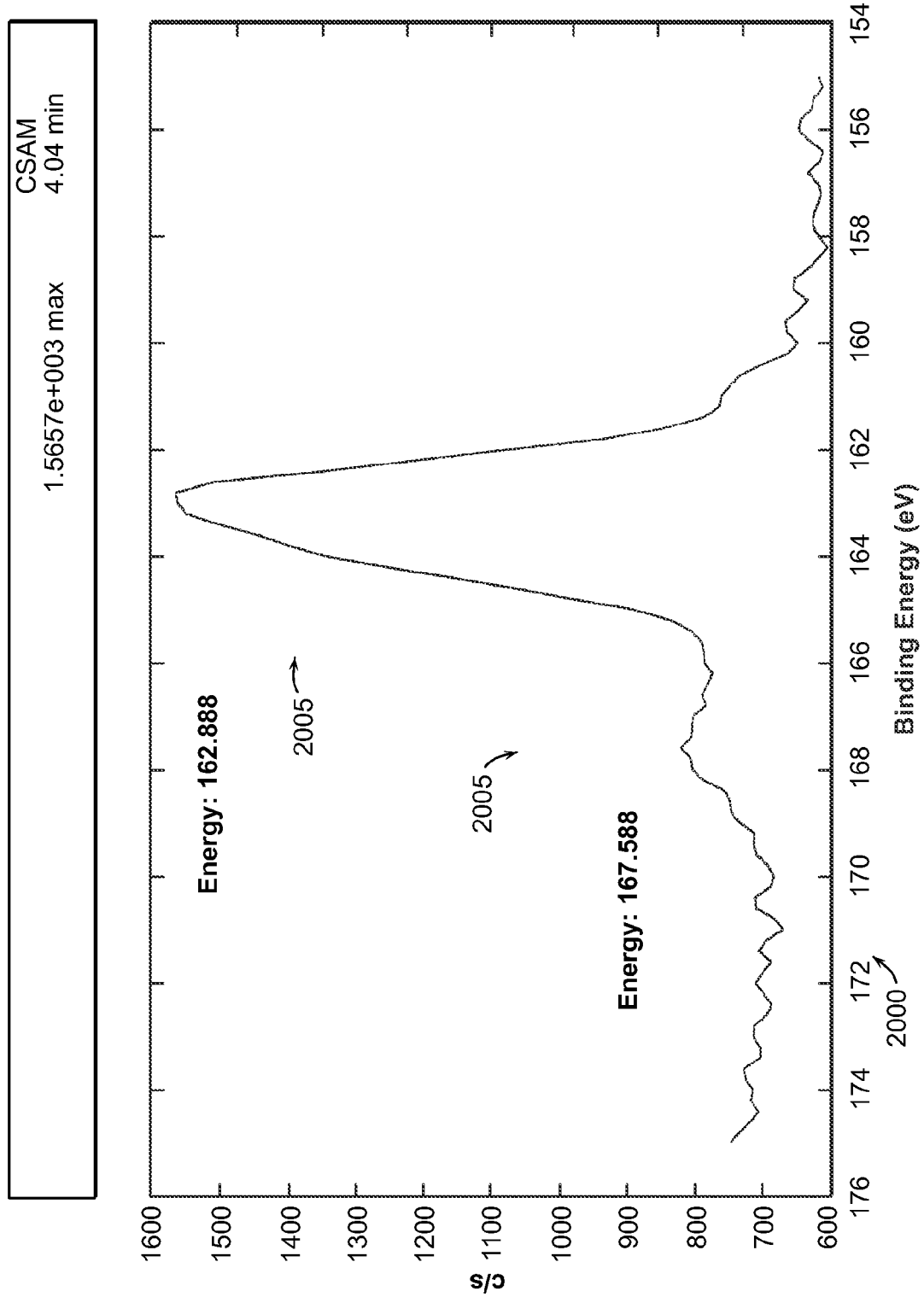
FIG. 20 shows an ESCA scan of a fresh Maxcel 740-based sorption media after it has been mixed with sulfur and reacted (unused and treated).

After the virgin Maxcel 740 catalyst was treated according to method 100 using the parameters set forth in Table 3, an ESCA scan was performed on a sample of the resulting media #6. FIG. 20 shows an ESCA scan 2000 of a sample of media #6. The ESCA scan indicates that sulfur species are present, as shown by peaks 2005. The composition of a sample of media #6 includes approximately 58.7% oxygen, 24.2% aluminum, 3.2% sulfur, 13.6% carbon, and 0.2% sodium. The sulfur exists as about 20% sulfate species and about 80% sulfide species. The capacity of samples of media #6, as determined by a spin test, ranged from about 1021 mg-mercury/kg-media to about 1630 mg-mercury/kg-media. Meanwhile, the capacity of a sample of media #6, as determined by a column test, was at least 3681 mg-mercury/kg-media. The capacity of another sample of media #6, as determined by a column test of extended duration, was at least 10,332 mg-mercury/kg-media (for an equivalent effective treatment life of over 18,160 bed volumes).

As stated generally herein, the parameters in Table 3 can be varied to achieve desired media. For example, during the reaction step (150), the hydrogen sulfide concentration can be varied from 2-5 vol %, the hydrogen concentration can be varied from 3-10 vol %, and the nitrogen concentration can be varied from 85-95 vol %. Furthermore, the reaction temperature can vary from 130-300° C., and the reaction time can vary from 0.5-2.0 hours. The amount of sulfur mixed with the substrate can vary between 10-35 wt % of the combined weight of the substrate and sulfur.

A water sample was treated with media #5 to reduce metal ion impurity levels. The concentrations of metals were analyzed. The results are shown in Table 4. As Table 4 shows, most metal ions, including mercury, arsenic, cadmium, were effectively removed and the residue barium and chromium levels were below the TCLP (Toxic Characteristic Leaching Procedure) limits.

TABLE 4

| Treatment of water sample by media #5 | | |
| --- | --- | --- |
| Metal Ion | Measure concentration | Unit |
| Arsenic | Non Detected | mg/L |
| Barium | 0.0575 | mg/L |
| Cadmium | Non Detected | mg/L |
| Chromium | 0.0660 | mg/L |
| Lead | Non Detected | mg/L |
| Selenium | Non Detected | mg/L |

TABLE 4-continued

| Treatment of water sample by media #5 | | |
| --- | --- | --- |
| Metal Ion | Measure concentration | Unit |
| Silver | Non Detected | mg/L |
| Mercury | Non Detected | mg/L |

As described throughout the disclosure, the methods, systems, and techniques presented herein overcome the limitations and drawbacks of the known techniques. It will be appreciated that the scope of the present invention is not limited to the above-described embodiments, but encompasses modifications of and improvements to what has been described.

What is claimed is:

1. A sorption media, comprising:
a support substrate, the support substrate comprising a porous metallic material; and
a sulfur species chemically bonded to the support substrate,
wherein the media includes at least 10 mol % aluminum species, and
wherein the sorption media further comprises an iron species.

2. The sorption media of claim 1, wherein the sulfur species comprises at least 50 mol % sulfate.

3. The sorption media of claim 2, wherein the sulfur species comprises at least 90 mol % sulfate.

4. The sorption media of claim 1, wherein the sorption media has a sulfur content of at least 0.2 mol %.

5. The sorption media of claim 1, wherein the bond between the sulfur species and support substrate reduces the amount of sulfur species removed from the support substrate when the media is in contact with a fluid relative to the amount of sulfur species that would be removed without said bond.

6. The sorption media of claim 1, wherein the sorption media further comprises a copper species.

7. The sorption media of claim 1, wherein the sulfur species is chemically bonded to the support substrate by at least one of an ionic bond and a covalent bond.

8. The sorption media of claim 1, wherein the support substrate comprises alumina.

9. A sorption media, comprising:
a support substrate, the support substrate comprising a porous metallic material; and
a sulfur species chemically bonded to the support substrate,
wherein the media includes at least 10 mol % aluminum species, and
wherein the sulfur species comprises at least 80 mol % sulfide.

10. A sorption media, comprising:
a support substrate, the support substrate comprising a porous metallic material; and
a sulfur species chemically bonded to the support substrate,
wherein the media includes at least 10 mol % aluminum species, and
wherein the sorption media has a contaminant capacity of at least 113 mg-mercury/kg-media.

11. The sorption media of claim 10, wherein the sorption media has a contaminant capacity of at least 2000 mg-mercury/kg-media.

12. The sorption media of claim 11, wherein the sorption media has a contaminant capacity of at least 3000 mg-mercury/kg-media.

13. The sorption media of claim 12, wherein the sorption media has a contaminant capacity of at least 10,000 mg-mercury/kg-media.

14. A sorption media, comprising:
a support substrate, the support substrate comprising a porous metallic material; and
a sulfur species chemically bonded to the support substrate,
wherein the media includes at least 9 mol % iron species, and
wherein the media further comprises an aluminum species.

15. The sorption media of claim 14, wherein the sulfur species comprises at least 70 mol % sulfide.

16. The sorption media of claim 15, wherein the sulfur species comprises at least 80 mol % sulfide.

17. The sorption media of claim 14, wherein the sorption media has a sulfur content of at least 1.7 mol %.

18. The sorption media of claim 14, wherein the bond between the sulfur species and support substrate reduces the amount of sulfur species removed from the support substrate when the media is in contact with a fluid relative to the amount of sulfur species that would be removed without said bond.

19. The sorption media of claim 14, wherein the sulfur species is chemically bonded to the support substrate by at least one of an ionic bond and a covalent bond.

20. The sorption media of claim 14, wherein the support substrate comprises iron oxides.

21. The sorption media of claim 14, wherein the support substrate comprises an iron-containing catalyst for the removal of sulfur compounds from a gas stream.

22. A sorption media, comprising:
a support substrate, the support substrate comprising a porous metallic material; and
a sulfur species chemically bonded to the support substrate,
wherein the media includes at least 9 mol % iron species, and
wherein the sulfur species comprises at least 60 mol % sulfate.

23. A sorption media, comprising:
a support substrate, the support substrate comprising a porous metallic material; and
a sulfur species chemically bonded to the support substrate,
wherein the media includes at least 9 mol % iron species, and
wherein the sorption media has a contaminant capacity of at least 340 mg-mercury/kg-media.

24. The sorption media of claim 23, wherein the sorption media has a contaminant capacity of at least 1000 mg-mercury/kg-media.

25. The sorption media of claim 24, wherein the sorption media has a contaminant capacity of at least 3500 mg-mercury/kg-media.

26. The sorption media of claim 25, wherein the sorption media has a contaminant capacity of at least 12,000 mg-mercury/kg-media.

27. A method of manufacturing a sorption media, comprising:
selecting a support substrate comprising a porous metallic material, the support substrate further comprising iron;
providing a doping mixture comprising a first sulfur species dissolved in a solvent;
contacting the selected support substrate with the doping mixture at a first temperature for a first duration to form a doped substrate; and
reacting the doped substrate at a second temperature in a selected atmospheric environment for a second duration to form the sorption media,
wherein the sorption media comprises a second sulfur species chemically bonded to the support substrate.

28. The method of claim 27, wherein the doping mixture includes at least one of ferric sulfate, ammonium sulfate, copper sulfate, and copper chloride.

29. The method of claim 27, wherein the first temperature is between about 20° C. and about 60° C.

30. The method of claim 27, wherein the first duration is between about 20 minutes and about 45 minutes.

31. The method of claim 27, wherein the second temperature is between about 150° C. and about 400° C.

32. The method of claim 27, wherein the second duration is between about 0.5 hours and about 6 hours.

33. The method of claim 27, wherein the atmospheric environment comprises about 3 vol % to about 10 vol % hydrogen.

34. The method of claim 27, wherein the atmospheric environment comprises about 50 vol % to about 95 vol % nitrogen.

35. The method of claim 27, wherein the doping mixture further comprises copper.

36. The method of claim 27, the support substrate further comprising a copper species.

37. The method of claim 27, wherein the second sulfur species is chemically bonded to the support substrate by at least one of an ionic bond and a covalent bond.

38. A method of manufacturing a sorption media, comprising:
selecting a support substrate comprising a porous metallic material, the support substrate further comprising alumina;
providing a doping mixture comprising a first sulfur species dissolved in a solvent;
contacting the selected support substrate with the doping mixture at a first temperature for a first duration to form a doped substrate; and
reacting the doped substrate at a second temperature in a selected atmospheric environment for a second duration to form the sorption media,
wherein the sorption media comprises a second sulfur species chemically bonded to the support substrate.

39. A method of manufacturing a sorption media, comprising:
selecting a support substrate comprising a porous metallic material;
providing a do in mixture comprising a first sulfur species dissolved in a solvent;
contacting the selected support substrate with the doping mixture at a first temperature for a first duration to form a doped substrate; and
reacting the doped substrate at a second temperature in a selected atmospheric environment for a second duration to form the sorption media, wherein the atmospheric environment comprises about 2 vol % to about 5 vol % hydrogen sulfide,
wherein the sorption media comprises a second sulfur species chemically bonded to the support substrate.

40. A method of manufacturing a sorption media, comprising:
selecting a support substrate comprising a porous metallic material;
providing a doping mixture comprising a first sulfur species dissolved in a solvent;
contacting the selected support substrate with the doping mixture at a first temperature for a first duration to form a doped substrate; and
reacting the doped substrate at a second temperature in a selected atmospheric environment for a second duration to form the sorption media, wherein the atmospheric environment comprises less than about 35 vol % air,
wherein the sorption media comprises a second sulfur species chemically bonded to the support substrate.

41. A method of manufacturing a sorption media, comprising:
selecting a support substrate comprising a porous metallic material, the support substrate further comprising alumina;
selecting an atmospheric environment comprising at least hydrogen sulfide; and
reacting the support substrate at a first temperature in the selected atmospheric environment for a first duration to form the sorption media,
wherein the selected sorption media comprises a sulfur species chemically bonded to the support substrate.

42. The method of claim 41, wherein the first temperature is between about 120° C. and about 400° C.

43. The method of claim 41, wherein the first duration is between about 1 hours and about 6 hours.

44. The method of claim 41, wherein the atmospheric environment comprises about 2 vol % to about 5 vol % hydrogen sulfide.

45. The method of claim 41, the support substrate further comprising iron and a copper species.

46. The method of claim 41, wherein the sulfur species is chemically bonded to the support substrate by at least one of an ionic bond and a covalent bond.

47. A method of manufacturing a sorption media, comprising:
selecting a support substrate comprising a porous metallic material;
selecting an atmospheric environment comprising at least hydrogen sulfide and further comprising about 3 vol % to about 10 vol % hydrogen; and
reacting the support substrate at a first temperature in the selected atmospheric environment for a first duration to form the sorption media,
wherein the selected sorption media comprises a sulfur species chemically bonded to the support substrate.

48. A method of manufacturing a sorption media, comprising:
selecting a support substrate comprising a porous metallic material;
selecting an atmospheric environment comprising at least hydrogen sulfide and further comprising about 50 vol % to about 95 vol % nitrogen; and
reacting the support substrate at a first temperature in the selected atmospheric environment for a first duration to form the sorption media,
wherein the selected sorption media comprises a sulfur species chemically bonded to the support substrate.

49. A method of manufacturing a sorption media, comprising:
selecting a support substrate comprising a porous metallic material;
selecting an atmospheric environment comprising at least hydrogen sulfide and further comprising less than about 35 vol % air; and
reacting the support substrate at a first temperature in the selected atmospheric environment for a first duration to form the sorption media,
wherein the selected sorption media comprises a sulfur species chemically bonded to the support substrate.

50. A method manufacturing a
sorption media, comprising:
selecting a support substrate comprising a porous metallic material;
selecting an atmospheric environment comprising at least hydrogen sulfide;
mixing elemental sulfur with the selected substrate; and
reacting the support substrate at a first temperature in the selected atmospheric environment for a first duration to form the sorption media, wherein the mixing elemental sulfur with the selected substrate occurs before reacting the support substrate in the selected atmospheric environment, wherein the selected sorption media comprises a sulfur species chemically bonded to the support substrate.

51. The method of claim 50, wherein an amount of the elemental sulfur mixed with the selected substrate is between about 10 wt % and about 35 wt % of a total weight of the elemental sulfur and selected substrate combined.

52. The method of claim 50, wherein the first temperature is between about 130° C. and about 300° C.

53. The method of claim 50, wherein the first duration is between about 0.5 hours and about 6 hours.

54. The method of claim 50, wherein the atmospheric environment comprises about 85 vol % to about 95 vol % nitrogen.

55. The method of claim 50, wherein the atmospheric environment comprises substantially no air.

* * * * *